(12) United States Patent
Seok et al.

(10) Patent No.: US 9,503,976 B2
(45) Date of Patent: Nov. 22, 2016

(54) GROUPING-BASED DATA TRANSCEIVING METHOD IN WIRELESS LAN SYSTEM AND APPARATUS FOR SUPPORTING SAME

(71) Applicant: LG Electronics Inc., Seoul (KR)

(72) Inventors: Yong Ho Seok, Anyang-si (KR); Jong Hyun Park, Anyang-si (KR); Hyang Sun You, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/357,741

(22) PCT Filed: Nov. 26, 2012

(86) PCT No.: PCT/KR2012/010042
§ 371 (c)(1),
(2) Date: May 12, 2014

(87) PCT Pub. No.: WO2013/077692
PCT Pub. Date: May 30, 2013

(65) Prior Publication Data
US 2014/0328238 A1    Nov. 6, 2014

Related U.S. Application Data

(60) Provisional application No. 61/563,597, filed on Nov. 24, 2011, provisional application No. 61/567,127, (Continued)

(51) Int. Cl.
*H04W 52/02* (2009.01)
*H04W 74/04* (2009.01)
*H04W 4/00* (2009.01)

(52) U.S. Cl.
CPC ......... *H04W 52/0212* (2013.01); *H04W 4/008* (2013.01); *H04W 52/0216* (2013.01); *H04W 74/04* (2013.01); *Y02B 60/50* (2013.01)

(58) Field of Classification Search
CPC ............. H04W 4/008; H04W 52/0212; H04W 74/04; H04W 52/00; H04W 52/0216
(Continued)

(56) References Cited

U.S. PATENT DOCUMENTS 8,849,315 B2 * 9/2014 Wentink ............ H04W 52/0216
455/458
9,137,823 B1 * 9/2015 Liu ..................... H04W 74/006
(Continued)

FOREIGN PATENT DOCUMENTS

| CN | 101502044 A | 8/2009 |
| CN | 101647311 A | 2/2010 |

(Continued)

*Primary Examiner* — Chi H Pham
*Assistant Examiner* — Robert Lopata
(74) *Attorney, Agent, or Firm* — Dentons US LLP

(57) ABSTRACT

Provided is a data transceiving method performed by a station (STA) in a wireless LAN system. The method comprises: receiving subgrouping parameter information from an access point (AP); determining whether a frame buffered in the STA subgroup in which the STA is contained exists or not based on the subgrouping parameter information; receiving a TIM element in a channel access interval for the STA subgroup from the AP if the buffered frame exists; and exchanging the AP and the frame in the channel access interval based on the TIM element.

5 Claims, 24 Drawing Sheets

Related U.S. Application Data filed on Dec. 6, 2011, provisional application No. 61/652,339, filed on May 29, 2012.

(58) Field of Classification Search
USPC .......................................................... 370/311
See application file for complete search history.

(56) References Cited

U.S. PATENT DOCUMENTS

| | | | |
|---|---|---|---|
| 2005/0254444 A1* | 11/2005 | Meier | H04W 4/06 370/312 |
| 2008/0025256 A1* | 1/2008 | Ginzburg | H04L 12/1881 370/329 |
| 2008/0049703 A1* | 2/2008 | Kneckt | H04W 68/00 370/342 |
| 2008/0146253 A1 | 6/2008 | Wentink | |
| 2010/0189021 A1* | 7/2010 | He | H04W 52/00 370/311 |
| 2010/0265864 A1* | 10/2010 | He | H04W 68/025 370/311 |
| 2011/0007678 A1* | 1/2011 | Kneckt | H04W 40/10 370/311 |
| 2011/0090833 A1 | 4/2011 | Kneckt et al. | |
| 2012/0127920 A1* | 5/2012 | Kobayashi | H04W 4/001 370/315 |
| 2012/0314696 A1* | 12/2012 | Liu | H04W 28/065 370/338 |
| 2013/0070642 A1* | 3/2013 | Kim | H04W 72/0413 370/254 |
| 2013/0170411 A1* | 7/2013 | Vermani | H04L 1/0001 370/310 |
| 2013/0250832 A1* | 9/2013 | Kim | H04W 52/0216 370/311 |
| 2014/0321348 A1* | 10/2014 | Wentink | H04W 68/02 370/311 |

FOREIGN PATENT DOCUMENTS

| | | |
|---|---|---|
| CN | 101861715 A | 10/2010 |
| EP | 2048823 A1 | 4/2009 |
| JP | 09307964 A | 11/1997 |
| JP | 2005287040 | 10/2005 |
| JP | 2007300506 A | 11/2007 |
| JP | 2008502275 A | 1/2008 |
| JP | 2009540718 A1 | 11/2009 |
| JP | 2010517478 A | 5/2010 |
| KR | 1020050074295 | 7/2005 |
| KR | 1020060012754 | 2/2006 |
| KR | 1020080075144 | 8/2008 |
| KR | 1020090010523 | 1/2009 |
| WO | 2005125055 A1 | 12/2005 |
| WO | 2007144688 A1 | 12/2007 |
| WO | 2008094630 A3 | 8/2008 |
| WO | 2008/144688 A1 | 11/2008 |
| WO | 2009035060 A1 | 3/2009 |

* cited by examiner

FIG. 22

| element ID | length | Current group ID | Number of group ID | Total number of AID per STA group | Group ID bitmap |
|---|---|---|---|---|---|
| 1 | 1 | 1 | 1 | 2 | Variable |
| 2210 | 2220 | 2230 | 2240 | 2250 | 2260 |

Octets:

2200

GROUPING-BASED DATA TRANSCEIVING METHOD IN WIRELESS LAN SYSTEM AND APPARATUS FOR SUPPORTING SAME

This application is a 35 USC §371 National Stage entry of International Application No. PCT/KR2012/010042 filed on Nov. 26, 2012, and claims priority to US Provisional Application Nos. 61/563,597 filed on Nov. 24, 2011; 61/567,127 filed on Dec. 6, 2011 and 61/652,339 filed on May 29, 2012, all of which are hereby incorporated by reference in their entireties as if fully set forth herein.

BACKGROUND OF THE INVENTION

1. Field of the Invention

The present invention relates to wireless communication, and more particularly, to a station (STA) grouping-based data transceiving method in a wireless LAN system and an apparatus for supporting the same.

2. Related Art

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

Unlike an existing wireless LAND system for supporting High Throughput (HT) and High Throughput (VHT) using 20/40/80/160/80+80 MHz bandwidth of 2 GHz and/or 5 GHz band, a wireless LAN system capable of being operated at a band less than 1 GHz is suggested. If the wireless LAN system is operated at a band less than 1 GHz, a service coverage by an access point AP may be expanded as compared with an existing LAN system. Accordingly, one AP manages more STAs.

If the number of STAs associated with the AP is considerably increased, a problem may occur in a Traffic Indication Map (TIM) protocol being a transceiving protocol for an STA operated in a power save mode and in a channel access operation of the STA. Accordingly, there is a need for a method where a wireless LAN system in which very many STAs coexist efficiently approaches a channel to transceive data.

SUMMARY OF THE INVENTION

The present invention to solve the above-described problems provides a grouping-based data transceiving method in a wireless area network system and an apparatus for supporting the same.

In an aspect, a method for transmitting and receiving data in a wireless local area network system is provided. The method performed by a station (STA) includes receiving subgrouping parameter information from an access point (AP), determining whether a frame buffered in a STA subgroup to which the STA belongs exists based on the subgrouping parameter information, receiving a traffic indication map (TIM) element in a channel access period for the STA subgroup from the AP if it is determined that the buffered frame exists, and exchanging frames with the AP during the channel access period based on the TIM element.

The subgrouping parameter information may comprise a group ID field to indicate an STA group to which the subgrouping parameter information is applied.

The method may further include determining whether the STA subgroup to which the STA belongs is indicated by the group ID field of the subgrouping parameter information. The STA group may be grouped based on an association identifier (AID) assigned when the STA is associated with the AP. The step of determining whether a frame buffered in the STA subgroup exists may be performed when the STA subgroup to which the STA belongs is indicated by the group ID field.

The subgrouping parameter information may further comprise a subgroup field to indicate the number of a plurality of STA subgroups included in an STA group indicated by the group ID field, and a subgroup index bitmap field to indicate whether there are buffered frames with respect to the plurality of STA subgroups, respectively.

The step of determining whether a frame buffered in the STA subgroup to which the STA belongs exists based on the subgrouping parameter information may include determining the STA subgroup of the STA based on the subgroup field of the subgrouping parameter information, and determining whether a buffered frame for the STA subgroup exists or not based on the subgroup index bitmap field.

The group index bitmap field may comprise a bitmap sequence to indicate whether groups buffered with respect to the plurality of STA subgroups included in the STA group exist or not, respectively The TIM element may comprise an STA group ID field to indicate an STA group to which the TIM element is applied, a subgroup index field to indicate an STA subgroup of the STA group to which the TIM element is applied, and a bitmap field to indicate whether there are frames buffered with respect to STAs of the STA subgroup indicated by the subgroup index field, respectively.

The step of exchanging the frames with the AP may comprise determining whether the TIM element is for the STA subgroup of the STA, determining whether the buffered frame for the STA exists or not based the bitmap field when the TIM element is for the STA subgroup of the STA, and receiving the buffered frame from the AP within the channel access period when the buffered frame exists.

When an STA group of the STA is the STA group indicated by the group ID field of the TIM element and the subgroup of the STA is the STA subgroup indicated by the subgroup index field of the TIM element, the TIM element may be determined for the STA subgroup of the STA.

In another aspect, a station (STA) for operated in a wireless local area network system is provided. The STA includes a transceiver configured to transmit and receive a radio signal, and a processor functionally connected with the transceiver and configured to receiving subgrouping parameter information from an access point (AP), determining whether a frame buffered in a STA subgroup to which the STA belongs exists based on the subgrouping parameter information, receiving a traffic indication map (TIM) element in a channel access period for the STA subgroup from the AP if it is determined that the buffered frame exists, and exchanging frames with the AP during the channel access period based on the TIM element.

A station (STA) grouping-based channel access method can perform STA grouping based on an AID of an STA to group channel access periods as STA groups so that the channel access periods are assigned to the STA groups. Each STA group or each STA subgroup may exchange data with the AP during a channel access period assigned to each STA group or each STA subgroup. Therefore, the wireless LAN system with very many STAs can efficiently exchange data per STA group.

A Traffic Indication Map (TIM) protocol based data can be transmitted and received based on STA grouping. TIM element based data transmission and reception can be efficiently provided by reducing an overhead of the TIM element. Since STAs of an STA group and/or an STA subgroup access a channel during a corresponding channel access period to request transmission of a buffered frame to the AP, efficiency of channel approach is increased as compared with the related art so that a throughput rate of data can be improved. Further, since remaining STAs are not unnecessarily operated in an awake state, power save efficiency can be improved.

BRIEF DESCRIPTION OF THE DRAWINGS

FIG. 22 is a block diagram illustrating an example of a grouping parameter information element format according to an embodiment of the present invention.

DESCRIPTION OF EXEMPLARY EMBODIMENTS

Figure 1:
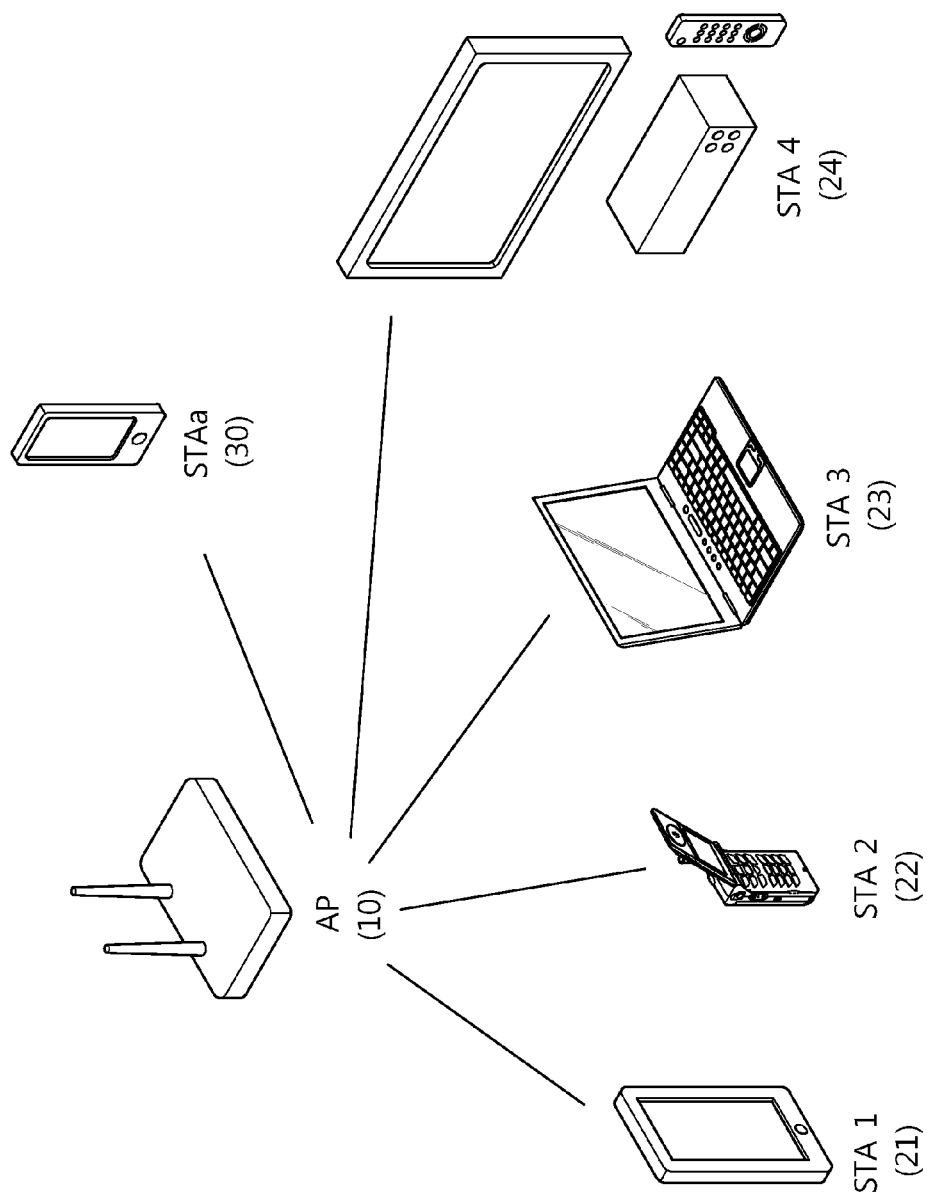
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1(21), non-AP STA2(22), non-AP STA3(23), non-AP STA4(24), and non-AP STAa (30)), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| Order | Information |
|---|---|
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Always sensing a channel for frame transmission and reception causes the STA to continue to consume power. The power consumption in the reception state makes little difference as compared with the power consumption in the transmission state, so that keeping the reception state causes the STA battery powered to consume relatively more power. Accordingly, when in the WLAN system a STA conducts channel sensing while continuously maintaining the reception waiting state, inefficient power consumption may arise without particularly increasing WLAN throughput, and thus, it is inappropriate in view of power management.

To compensate for such problems, the WLAN system supports a power management (PM) mode for a STA. The STA power management mode is separated into an active mode and a power save (PS) mode. The STA operates basically in the active mode. The STA operating in the active mode maintains an awake state. That is, the STA remains at a state of being able to perform normal operation such as frame transmission and reception or channel sensing.

When in normal operation, the STA shifts between the doze state and awake state. In the doze state, the STA operating with the minimum power and does not receive radio signals including data frames from the AP. Further, in the doze state, the STA does not conduct channel sensing.

As the STA operates as long as possible, power consumption decreases, so that the operation period of the STA is increased. However, since frame transmission and reception is impossible in the doze state, it cannot be left at the operation state unconditionally. In case there is a frame to be transmitted from the STA operating in the doze to the AP, the STA shifts to the awake state, thereby able to receive frames. However, in case the AP has a frame to be transmitted to the STA operating in the doze state, the STA cannot receive the frame nor is the STA able to be aware of the existence of the STA. Accordingly, the STA may require the operations of being aware of whether there is a frame to be sent to the STA, and if any, shifting to the awake state at a specific period so as to receive the frame. This is described below in connection with FIG. 2.

Figure 2:
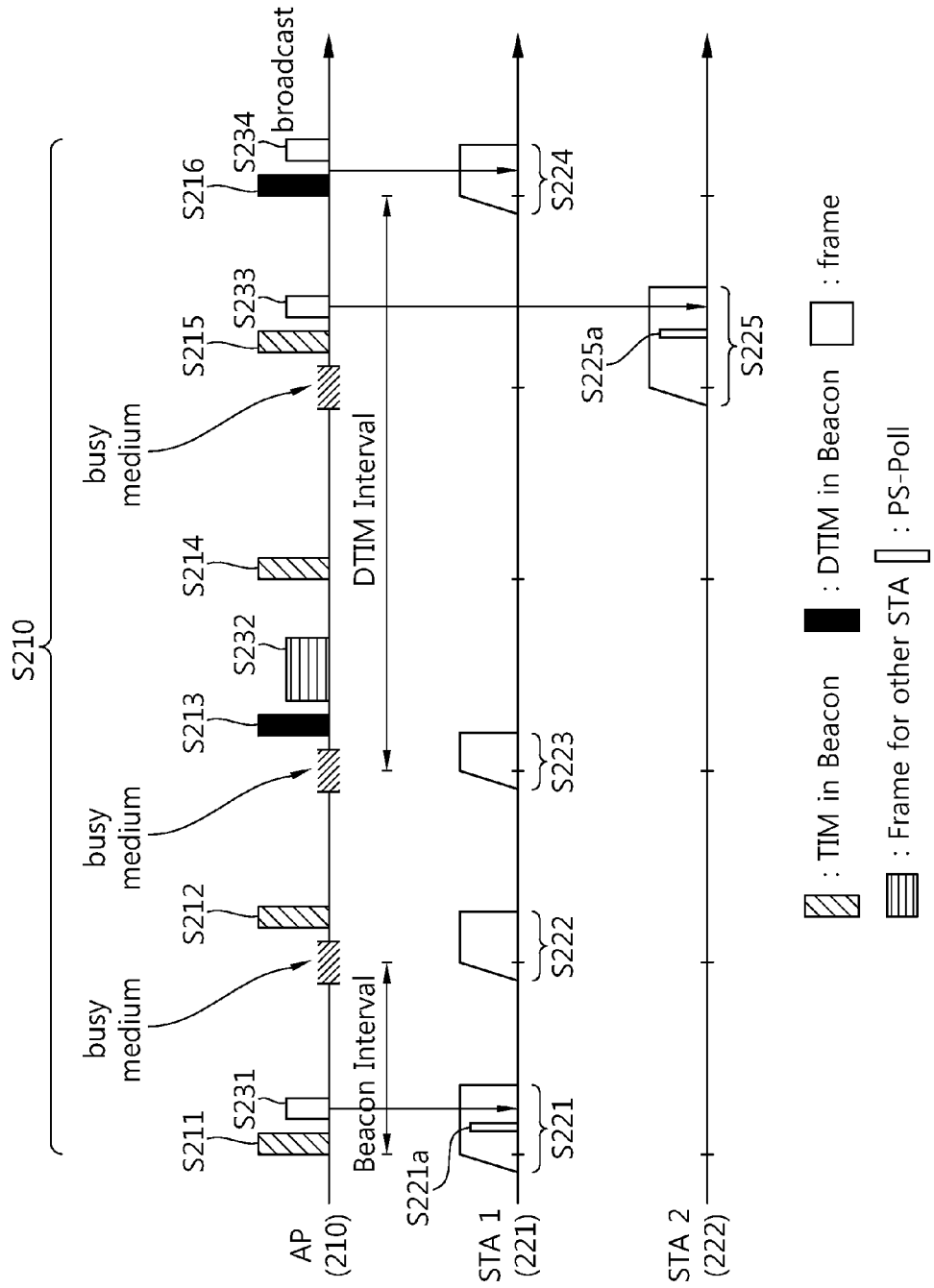
FIG. 2 is a view illustrating an example of power management operation.

FIG. 2 is a view illustrating an example of power management operation.

Referring to FIG. 2, the AP 210 sends a beacon frame to STAs in a BSS at a constant period (S210). The beacon frame includes a Traffic Indication Map (TIM) information element. The TIM element includes information indicating that the AP 210 buffers a bufferable frame (or bufferable unit BU) for the STAs associated with the AP 210 and that the frame is to be sent. The TIM element includes a TIM used to indicate a unicast frame and a Delivery Traffic Indication Map (DTIM) used to indicate a multicast or broadcast frame.

The AP 210 transmits a DTIM once every three beacon frames of transmission.

STA1 221 and STA2 222 are STAs operating in PS mode. STA1 221 and STA2 222 shift from the doze state to the awake state at every wakeup interval of a specific period so that the STAs may receive the TIM element transmitted from the AP 210.

A specific wakeup interval may be configured so that STA1 221 may shift to the awake state at every beacon interval to thus receive a TIM element. Accordingly, when the AP 210 first sends out a beacon frame (S211), STA1 221 switches to the awake state (S221). STA1 221 receives the beacon frame and obtains the TIM element. In case the obtained TIM element indicates that a bufferable frame to be sent to STA1 221 is being buffered, STA1 221 transmits a PS-poll frame to the AP 210 to request that the AP 210 send a frame (S221a). In response to the PS-poll frame, the AP 210 sends a frame to STA1 221 (S231). When completely receiving the frame, STA1 221 turns back to the doze state.

When the AP 210 sends out a second beacon frame, since the medium is occupied, for example, as if another device gains access to the medium, the AP 210 fails to send a beacon frame at exact beacon interval and may deferred transmission of the beacon frame (S212). In such case, STA1 221 turns its operation mode to the awake state according to the beacon interval, but cannot receive the deferred beacon frame, so that STA1 221 switches back to the doze state (S222).

When the AP 210 sends out a third beacon frame, the beacon frame may include a TIM element that is set as DTIM. However, since the medium is occupied, the AP 210's transmission of the beacon frame is deferred (S213). STA1 221 switches to the awake state in accordance with the beacon interval and may obtain the DTIM through the beacon frame transmitted by the AP 210. The DTIM obtained by STA1 221 indicates that there is no frame to be transmitted to STA1 221 and that there is a frame for other STA. Accordingly, STA1 221 shifts back to the doze state. The AP 210, after transmission of the beacon frame, sends a frame to the STA (S232).

The AP 210 sends a fourth beacon frame (S214). However, STA1 221 could not obtain the information indicating that a bufferable frame for itself remains buffered through the previous twice reception of the TIM element, and thus, STA1 221 may adjust the wakeup interval for reception of a TIM element. Or, in case the beacon frame transmitted by the AP 210 includes signaling information for adjusting the wakeup interval value of STA1 221, the wakeup interval value of STA1 221 may be adjusted. In this example, STA1 221 may change its configuration so that shift of the operation state for receiving a TIM element is performed at every three beacon intervals rather than at every beacon interval. Accordingly, STA1 221 stays at the doze state after the AP 210 sends a fourth beacon frame (S214) and when the AP 210 transmits a fifth beacon frame (S215), and thus, it cannot obtain the TIM element.

When the AP 210 sends out a sixth beacon frame (S216), STA1 221 switches to the awake state and obtains the TIM element included in the beacon frame (S224). The TIM element is a DTIM indicating that there is a broadcast frame, so that STA1 221 does not transmit a PS-poll frame to the AP 210 and receives a broadcast frame transmitted by the AP 210 (S234).

Meanwhile, the wakeup interval configured in STA2 222 may have a longer period than that of STA1 221. Accordingly, when the AP 210 sends a fifth beacon frame (S215), STA2 222 may switch to the awake state to receive a TIM element (S225). STA2 222 is aware that there is a frame to be sent thereto through the TIM element, and in order to request transmission, sends a PS-poll frame to the AP 210 (S225a). The AP 210 sends a frame to STA2 222 in response to the PS-poll frame (S233).

In order to operate the power save mode as shown in FIG. 2, the TIM element includes a TIM indicating whether there is a frame to be sent to the STA or a DTIM indicating whether there is a broadcast/multicast frame. The DTIM may be embodied by configuring a field of the TIM element.

Figure 3:
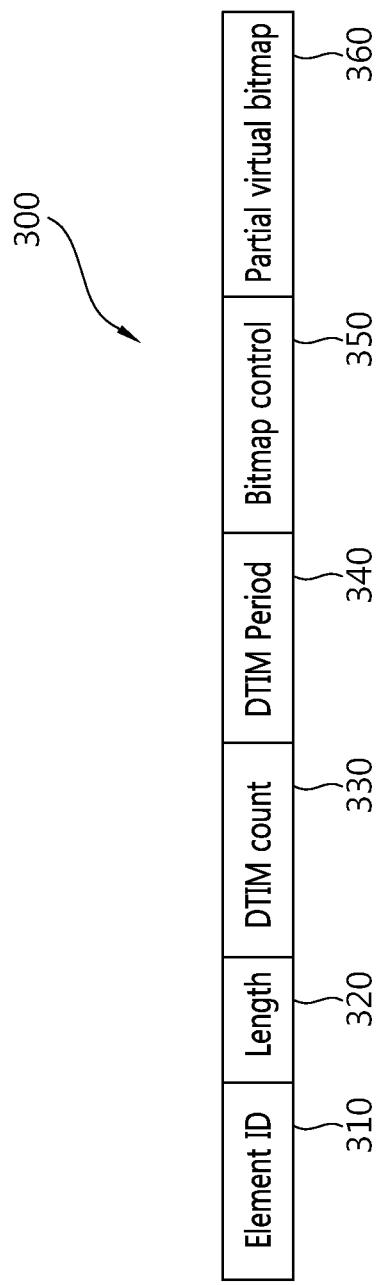
FIG. 3 is a block diagram illustrating an example of a TIM element format.

FIG. 3 is a block diagram illustrating an example of a TIM element format.

Referring to FIG. 3, the TIM element 300 includes an element ID field 310, a length field 320, a DTIM count field 330, a DTIM period field 340, a bitmap control field 350, and a partial virtual bitmap field 360.

The element ID field 310 indicates that an information element is a TIM element. The length field 320 indicates the whole length including itself and subsequent fields. The maximum value may be 255 and may be set in octets.

The DTIM count field 330 indicates whether a current TIM element is a DTIM, and unless it is a DTIM, indicates the number of remaining TIMs until the DTIM is transmitted. The DTIM period field 340 indicates a period at which the DTIM is transmitted, and the period at which the DTIM is transmitted may be set as a multiple of the count of transmission of a beacon frame.

The bitmap control field 350 and the partial virtual bitmap field 360 indicate whether a bufferable frame is buffered for a specific STA. The first bit in the bitmap control field 350 indicates whether there is a multicast/broadcast frame to be sent. The remaining bits are set to indicate an offset value to interpret the subsequent partial virtual bitmap field 360.

The partial virtual bitmap field 360 is set as a value indicating whether there is a bufferable frame to be sent to each STA. This may be set in the bitmap form where a bitmap corresponding to the AID value of a specific STA is set as 1. According to the AID order, allocation may be done from 1 to 2007, and as an example, if the fourth bit is set as 1, it means that traffic is buffered in the AP which is to be sent to the STA whose AID is 4.

Meanwhile, in the circumstance where bits set as consecutive 0's come up frequently in configuring the bit sequence of the partial virtual bitmap field 360, using the whole bit sequence configuring the bitmap may be insufficient. For this, the bitmap control field 350 may contain offset information for the partial virtual bitmap field 360.

Figure 4:
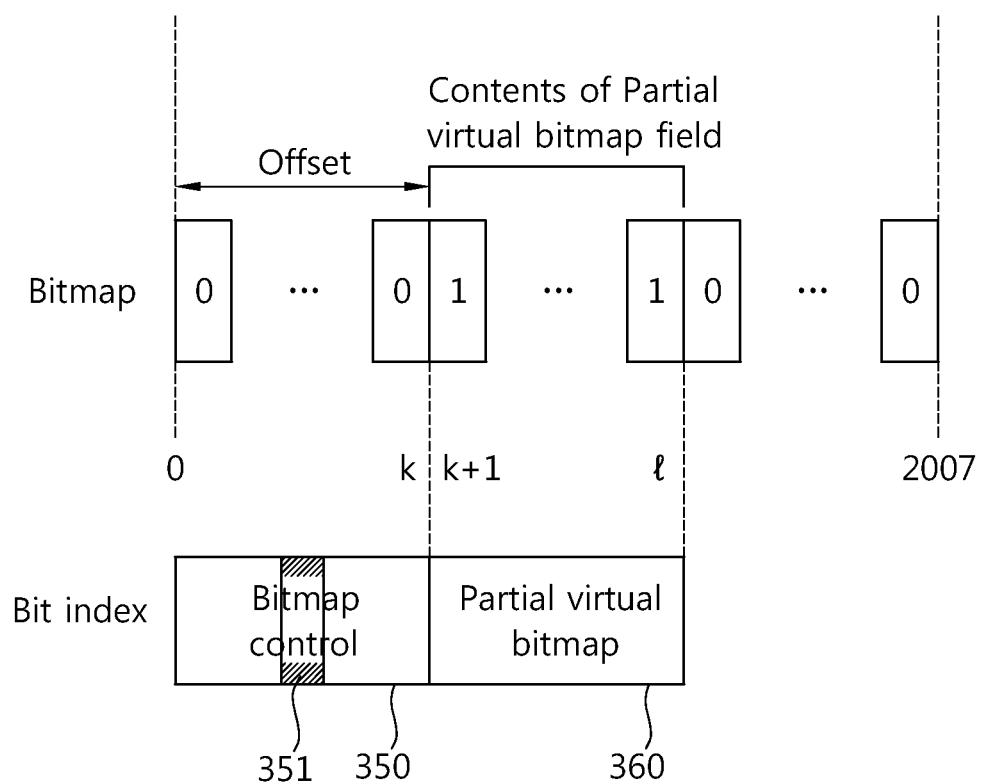
FIG. 4 is a view illustrating an example of a bitmap control field and a partial virtual bitmap field according to an embodiment of the present invention.

FIG. 4 is a view illustrating an example of a bitmap control field and a partial virtual bitmap field according to an embodiment of the present invention.

Referring to FIG. 4, the bitmap sequence constituting the partial virtual bitmap field 360 indicates whether the STA having an AID corresponding to the bitmap index includes a buffered frame. The bitmap sequence constitutes indication information on AIDs 0 to 2007.

The bitmap sequence may have consecutive 0's from the first bit to the kth bit. Further, consecutive 0's may be set from the other 1th bit to the last bit. This indicates that the STAs assigned AIDs 0 to k and the STAs assigned with 1 to 2007 do not have any buffered frame. As such, the sequence of consecutive 0's from $0^{th}$ to the kth in the early part of the bitmap sequence may be provided offset information and the sequence of 0's in the latter part may be omitted, thereby reducing the size of the TIM element.

For this, the bitmap control field 350 may include a bitmap offset subfield 351 that contains offset information of a sequence of consecutive 0's in the bitmap sequence. The bitmap offset subfield 351 may be set to indicate k, and the partial virtual bitmap field 360 may be set to include the k+1th bit to the 1−1th bit of the original bitmap sequence.

A detailed responding procedure of the STA that has received the TIM element is described with reference to FIGS. 5 to 7.

Figure 5:
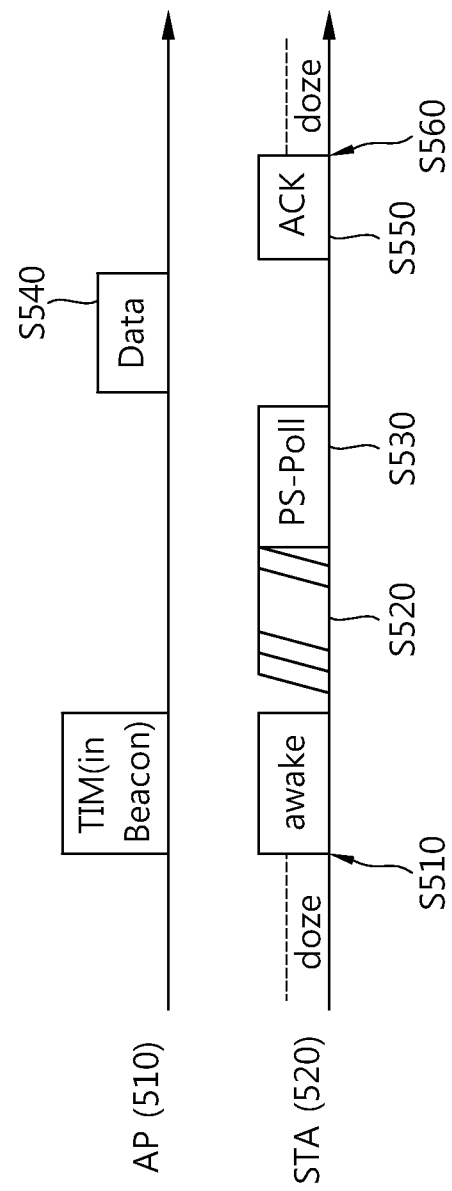
FIG. 5 is a flowchart illustrating an example of an AP's responding procedure in a TIM protocol.

FIG. 5 is a flowchart illustrating an example of an AP's responding procedure in a TIM protocol.

Referring to FIG. 5, the STA 520 shifts its operation state from doze state to awake state in order to receive a beacon frame including a TIM from the AP 510 (S510). The STA 520 may be aware that there is a buffered frame to be sent thereto by interpreting the received TIM element.

The STA 520 contends with other STAs for medium access to transmit a PS-poll frame (S520) and sends a PS-poll frame to the AP 510 for requesting transmission of a data frame (S530).

When receiving the PS-poll frame transmitted from the STA 520, the AP 510 sends a frame to the STA 520 (S540). The STA 520 receives the data frame and in response transmits an ACK (acknowledgement) frame to the AP 510 (S550). Thereafter, the STA 520 shifts its operating mode back into the doze state (S560).

The AP may transmit data at a specific time after receiving the PS-poll frame rather than sending a data frame right after receiving the PS-poll frame from the STA as shown in FIG. 5.

Figure 6:
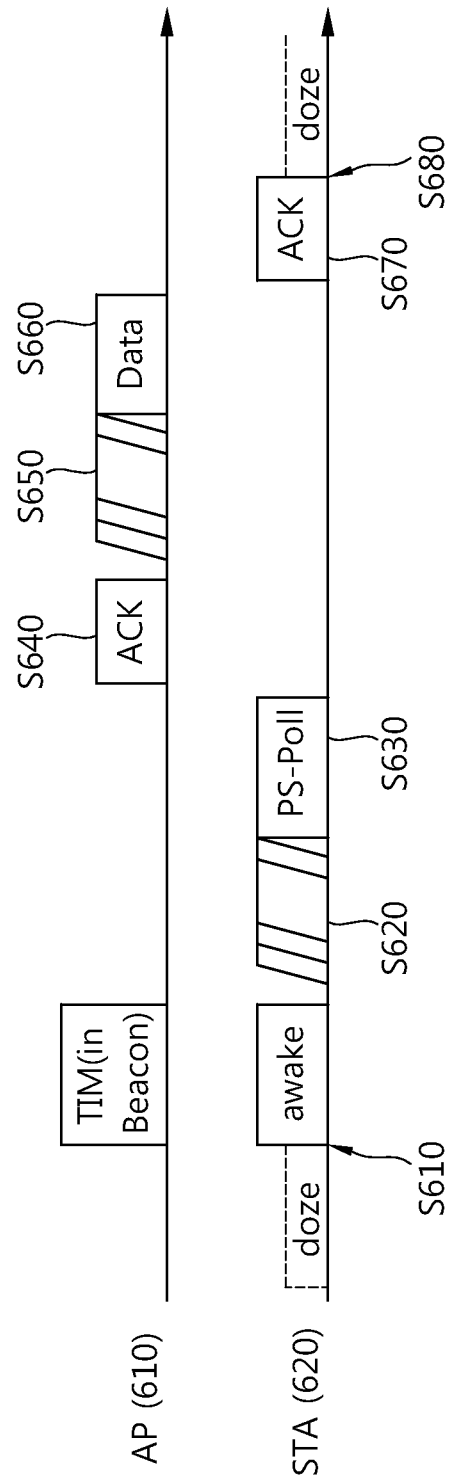
FIG. 6 is a flowchart illustrating another example of an AP's responding procedure in a TIM protocol.

FIG. 6 is a flowchart illustrating another example of an AP's responding procedure in a TIM protocol.

Referring to FIG. 6, the STA 620 shifts its operation mode from doze state to awake state in order to receive a beacon frame including a TIM from the AP 610 (S610). The STA 620 may be aware that there is a buffered frame to be sent thereto by interpreting the received TIM element.

The STA 620 contends with other STAs for medium access for transmission of the PS-poll frame (S620) and sends the PS-poll frame to the AP 610 for requesting the transmission of a data frame (S630).

In case, despite receiving the PS-poll frame, the AP 610 fails to prepare for a data frame for a specific time interval, the AP 610, instead of immediately transmitting a data frame, sends an ACK frame to the STA 620 (S640). This is a feature of a deferred response different from step S540 in which the AP 510 shown in FIG. 5 sends a data frame to the STA 520 immediately in response to the PS-poll frame.

The AP 610, if a data frame is ready after transmission of the ACK frame, performs contention (S650), and then sends a data frame to the STA 620 (S660).

The STA 620 sends an ACK frame to the AP 610 in response to reception of the data frame (S670) and switches its operation mode to the doze state (S680).

If the AP sends a DTIM to the STA, a TIM protocol procedure that is performed thereafter may differ.

Figure 7:
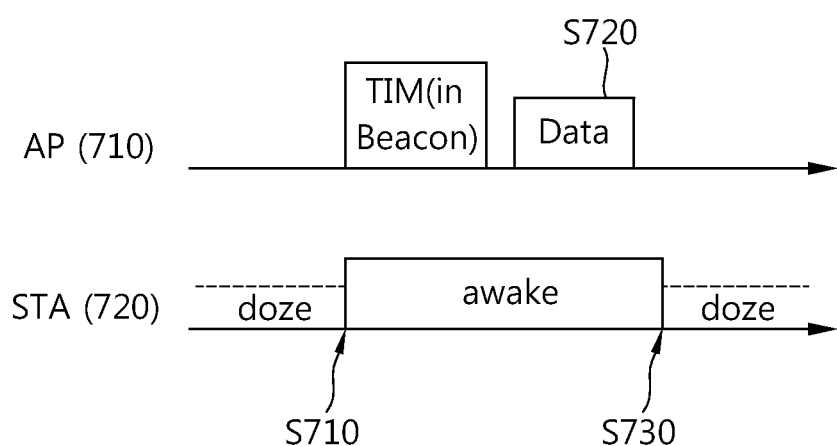
FIG. 7 is a flowchart illustrating a procedure of a TIM protocol by a DTIM.

FIG. 7 is a flowchart illustrating a procedure of a TIM protocol by a DTIM.

Referring to FIG. 7, STAs 720 switch their operation mode from the doze state to the awake state in order to receive a beacon frame including a TIM element (S710). The STAs 720 may be aware that a multicast/broadcast frame is to be transmitted through the received DTIM.

The AP 710 sends out a multicast/broadcast frame after transmission of the beacon frame including the DTIM (S720). The STAs 720 switch their operation state back to the doze state after receiving the multicast/broadcast frame transmitted by the AP 710.

In the power save mode operation method based on the TIM protocol described in connection with FIGS. 2 to 7, the STAs may verify whether there is a buffered frame to be transmitted due to buffered traffic through the STA identification information included in the TIM element. The STA identification information may be information associated with an Association Identifier (AID) that is an identifier assigned when the STA is associated with the AP. The STA identification information may be configured to directly indicate the AIDs of the STAs having a buffered frame or may be configured in the bitmap type in which a bit order corresponding to the AID value is set as a specific value. The STAs may be aware that there is a frame buffered thereto if the STA identification information indicates its AID.

Hereinafter, Tunneled Direct Link Setup (TDLS) is described.

The TDLS is a protocol to determine negotiation and method between STAs by the STAs in order to avoid and reduce network congestion. In order to support DLS between STAs supporting Quality of Service (QoS), management frames such as a DLS Setup request, a DLS setup response, and a DLS teardown may be transferred between STAs without help from the AP. The TDLS is based on encapsulation and transmission of management frames such as a DLS Setup request, a DLS setup response, and a DLS teardown to a data frame.

Figure 8:
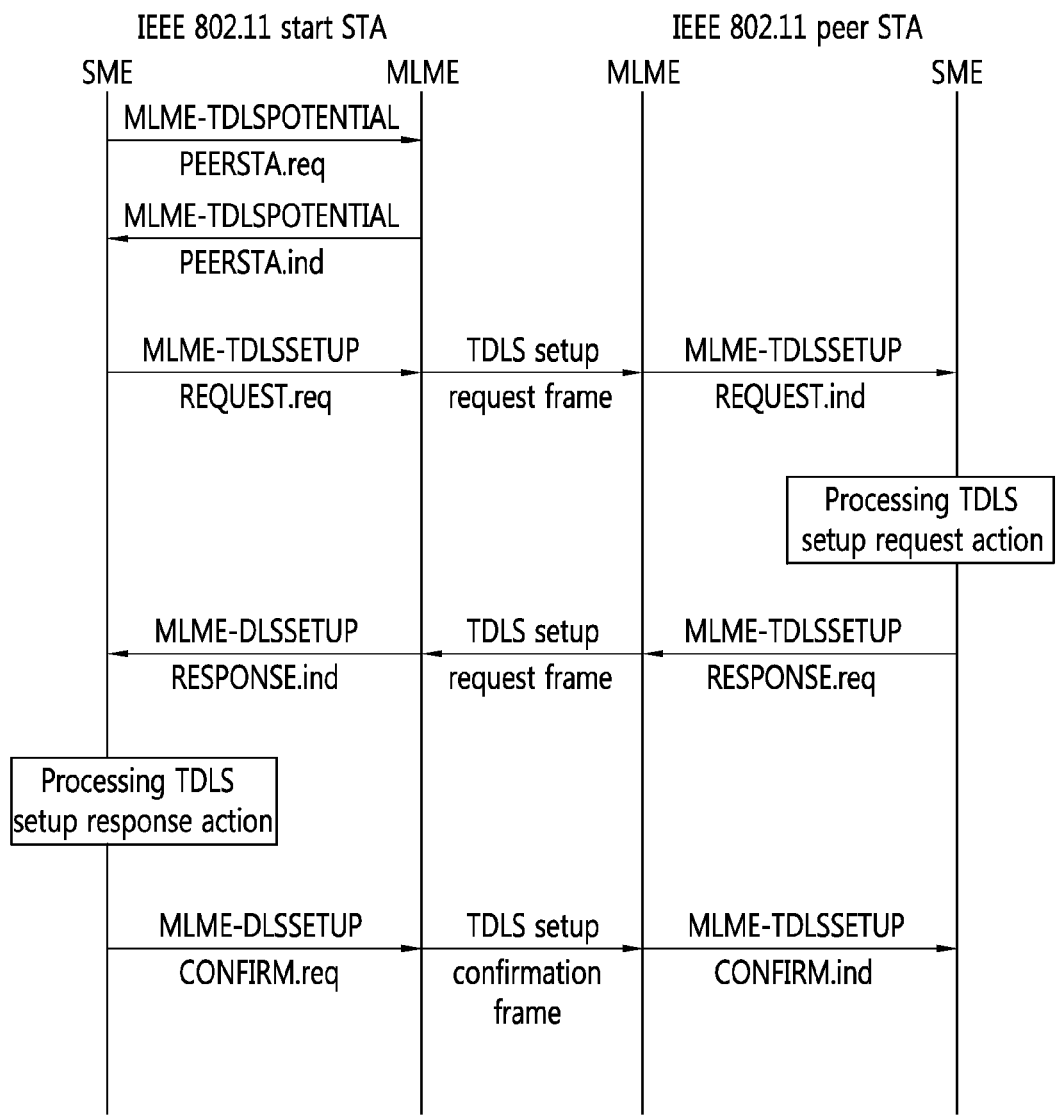
FIG. 8 is a diagram illustrating a signaling procedure to establish TDLS direct link.

A procedure of establishing TDLS direct link may be performed through signaling between two STAs as illustrated in FIG. 8.

FIG. 8 is a diagram illustrating a signaling procedure to establish TDLS direct link.

Referring to FIG. 8, a frame may be transceived between a TDLS initiating STA establishing TDLS direct link and a TDLS peer STA being a target of establishment of the TDLS direct link.

The TDLS direct link may be established where the TDLS initiating STA transmits a TDLS setup request frame to the TDLS peer STA through the AP, the TDLS peer STA transmits a TDLS setup response frame through the AP as a response to the TDLS setup request, and the TDLS initiating STA transmits a TDLS setup confirmation frame to the TDLS peer STA through the AP in order to confirm that the TDLS setup response frame is received.

When the TDLS direct link is established, the TDLS initiating STA and the TDLS peer STA may directly transceive the frame without through the AP.

In recent years, an M2M is attracting attention as a next generation communication technology. A next generation wireless LAN system supports the above M2M. Meanwhile, a TIM protocol to transceive a data frame of an STA operating in a power save mode in a current wireless LAN system needs to consider following M2M related characteristics in order to support the M2M.

1. A large number of STAs in the next generation wireless LAN system supporting the M2M, the number of STAs associated with one AP may be significantly more than that of an existing wireless LAN system. That is, in the existing wireless LAN system, more STAs than 2007 being the maximum number of AIDs which can be assigned to the STA may be associated with the AP. In this case, if a reserved AID is used, the AID may be assigned to maximum 16383 STAs. A use case of the next generation wireless LAN system for supporting the M2M considers a case where at least 6000 STAs are associated with the AP.

2. Low transmission rate there are a plurality of applications to support a low transmission rate in a wireless LAN system for supporting the M2M. Accordingly, when the size of bitmap type information included in the TIM element is large but the TIM element is transmitted with a low rate, a time taken to determine whether a buffered frame for an STA exists is increased as compared with that of the existing LAN system. In this case, the STA operating in the power save mode may unnecessarily consume power. Accordingly, there is a demand for a scheme capable of reducing an amount of bitmap type information of the TIM element.

3. Traffic with a very long interval most of STAs for supporting the M2M has a traffic which periodically exchanges a small amount of data. Since a transmission period of the traffic is very long, the number of STAs with a frame capable of receiving from the AP during one beacon period is less than that of an existing LAN system.

When taking into consideration the foregoing related characteristics of the next generation wireless LAN system, if the sizes of the bitmap type information is large but most of the sizes thereof is 0, a method of compressing a format of the bitmap type information may be suggested. However, according to a current standard of the wireless LAN system, when the number of STAs exceeds 2008, an existing TIM element is not applicable as it is. This is because the size of the bitmap type information is considerably increased so that an existing frame format cannot support the bitmap type information.

A method of implementing information as illustrated in FIG. 4 is applicable to the method of compressing the bitmap type information. Accordingly, a sequence configuring real bitmap information may be implemented by a remaining bitmap sequence among entire bitmap sequences by omitting a sequence composed of continuous 0 at a part before the entire bitmap sequences indicating whether a buffered frame is included in each STA to provide offset information. In this case, when the number of STAs with the buffered frame is small but a difference of AIDs assigned to respective STAs is great, it may be inefficient. For example, if frames with respect to two STAs to which AIDs with values of 10 and 2000 are assigned are buffered, a length of the bitmap type information is 1990 but a value of the bitmap information except for both ends thereof is 0. That is, when the number of STAs associated with the AP is small, a great problem may not occur. However, when the number of STAs is increased so that a value of the assigned AID is increased, it may be difficult to significantly reduce the information by compressing the bitmap type information in this manner.

In a current WLAN system, the number of stations associated with the AP is several tens. However, when the M2M is supported, the number of association stations is rapidly increased. As described above, there is a need for an efficient operating method associated with an AID capable of being set to a very high value in a wireless LAN system in which the number of STA associated with the AP may be rapidly increased.

Hereinafter, a method of assigning AID to a large number of (for example, at least 2007) STAs so that the STAs efficiently approach a channel to transceive data is suggested. To this end, a method of grouping STAs is suggested.

The STA grouping according to the present invention may be performed based on grouping AIDs of an STA. Identification (ID) information capable of identifying groups may be applied to each group. Hereinafter, information to identify groups is referred to as 'group ID'. A following provided group ID is ID information different from the above group ID for MU-MIMO.

There are various methods of grouping the STAs based on AIDs. As one example, specific number of bits before an AID assigned to the STA is used as the group ID. This may be implemented as illustrated in FIG. 9.

Figure 9:
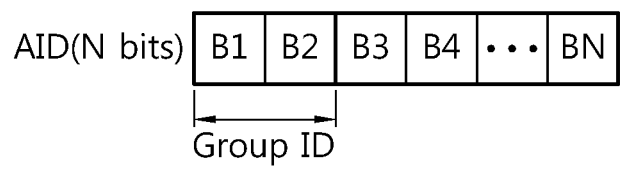
FIG. 9 is a diagram illustrating an example of an STA grouping method according to an embodiment of the present invention.

FIG. 9 is a diagram illustrating an example of an STA grouping method according to an embodiment of the present invention.

Referring to FIG. 9, first two bits B1 and B2 of an AID assigned to an STA may be set to indicate a group ID of the STA. In the embodiment, the group ID is implemented with two bits, total 4 group IDs may be implemented. All STAs associated with the AP may be grouped as total 4 groups. Meanwhile, the number of divided groups may differently set by adjusting the number of bits to indicate the group ID.

As another example of a method of grouping an STA based on an AID, a specific range of a plurality of AIDs is assigned to a specific STA group. For example, when a group ID 1 is expressed as offset A, length B, STAs to which AIDs of A to A+B−1 are includes in an STA group identified by a group ID 1. An example of the STA grouping may be implemented as illustrated in FIG. 10.

Figure 10:
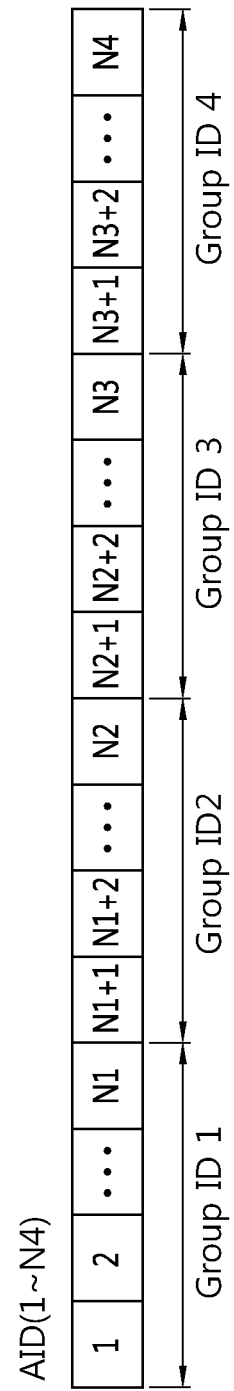
FIG. 10 is a diagram illustrating another example of an STA grouping method according to the embodiment of the present invention.

FIG. 10 is a diagram illustrating another example of an STA grouping method according to the embodiment of the present invention.

Referring to FIG. 10, it is assumed that entire AIDs are 1 to N4 AIDs, and an STA is grouped as total 4 STA groups.

AIDs belonging to a group ID 1 are 1 to N1 AIDs, which means that STAs to which AIDs 1 to N1 are assigned are grouped as an STA group according to a group ID 1. Meanwhile, corresponding AIDs may be expressed as offset 1, length N1.

AIDs belonging to a group ID 2 are N1+1 to N2, which means that STAs to which N1+1 to N2 AIDs are assigned are groups as an STA group according to a group ID 2. Meanwhile, corresponding AIDs may be expressed as offset N1+1, and length N2-N1.

AIDs belonging to a group ID 3 are N2+1 to N3 AIDs, which mean that STAs to which N2+1 to N3 AIDs are grouped as an STA group according to a group ID 3. Meanwhile, corresponding AIDs may be expressed as offset N2+1, length N3-N2.

AIDs belonging to a group ID 4 are N2+1 to N3 AIDs, which mean that STAs to which N2+1 to N3 AIDs are grouped as an STA group according to a group ID 4. Meanwhile, corresponding AIDs may be expressed as offset N3+1, length N4-N3. STAs to which the same group ID is assigned may be expressed by offset and a length of an AID.

Meanwhile, when STAs are grouped as shown in FIG. 10, the same number of AIDs is assigned to a group of each STA. If the number of groups in the STA is set to a square of 2, as illustrated in FIG. 9, specific bits before a group ID may be used as a group ID to identify an STA group.

According to FIG. 9 and FIG. 10, grouping of the STA may be achieved through one step. However, the grouping of the STA may be achieved through a plurality of steps. For example, entire STAs may be grouped as an STA group, and an STA included in a specific STA group may be grouped as an STA subgroup. In this case, the first specific bits of a bit sequence configuring an AID are a group ID to identify an STA group, and specific bits after the first specific bits of a bit sequence may be used as a subgroup index to identify an STA-sub group. This may be implemented as illustrated in FIG. 11.

Figure 11:
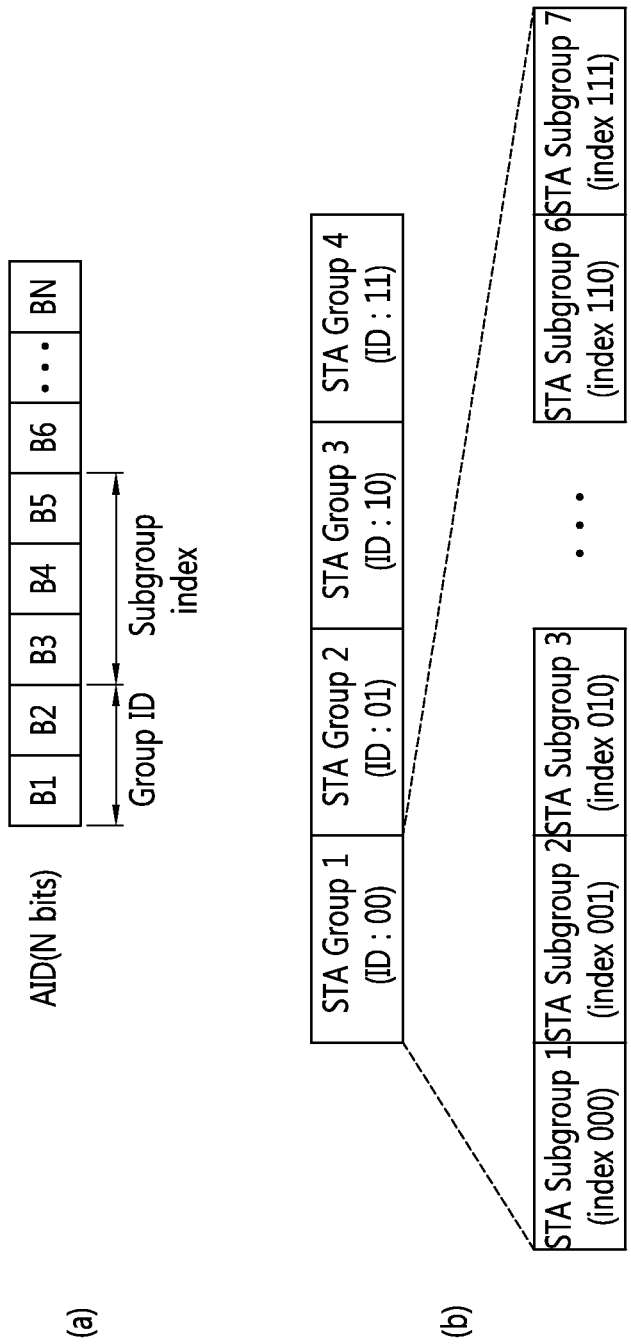
FIG. 11 is a diagram illustrating another example of STA grouping according to the embodiment of the present invention.

FIG. 11 is a diagram illustrating another example of STA grouping according to the embodiment of the present invention.

Referring to subfigure (a) of FIG. 11, first two B1 and B2 in an AID bit sequence may be set to indicate a group ID of an STA, and next three bits B3, B4, and B5 may be set to indicate a subgroup index of an STA.

In an example of STA grouping in subfigure (b) of FIG. 11, since a group ID is implemented with 2 bits, total 4 group IDs may be implemented, and all STAs may be grouped as total 4 groups. Since a subgroup index is implemented with 3 bits, total 8 subgroup indexes may be implemented, and STAs included in a specific STA group may be grouped as total 8 STA subgroups.

As shown in FIG. 11, when the STA grouping is performed, a specific STA group may be indicated, and a specific subgroup belonging to a specific STA may be indicated based on a group ID and a subgroup index.

In addition, at least one STA subgroup may be indicated based on a group ID, subgroup off and a subgroup length. The subgroup offset indicates an STA subgroup having the smallest subgroup index in at least one STA subgroup among a plurality of STA subgroups of an STA group indicated by a group ID. The subgroup length indicates the number of STAs of a continuous index including an STA subgroup indicated by the subgroup offset. For example, when grouping is performed as illustrated in FIG. 11(b), STA subgroups 3 to 5 of an STA group 1 may be indicated through a group ID 1(00), subgroup offset 3(010), and a subgroup length 3.

Meanwhile, the number of bits in FIG. 11 is illustrative purpose only and a group ID and a subgroup index may be implemented through bits having various lengths. A range of the present invention may include an example of a simple variation of the number of bits.

If the STA is grouped, STAs may access a channel at different time intervals according a group ID and/or a subgroup index. When the STAs operate in a power save mode, the STAs enter an awake state at a channel access period for the STAs to access the channel. If the channel access period is terminated, the STAs may enter a sleep state. Accordingly, a problem associated with an over load due to an increased TIM size which may be caused by a large number of STAs and a channel access problem may be solved, and data may be efficiently transceived. Further, an efficiency of the power save mode may be increased. An example of a channel access according to the STA group is illustrated in FIG. 12.

Figure 12:
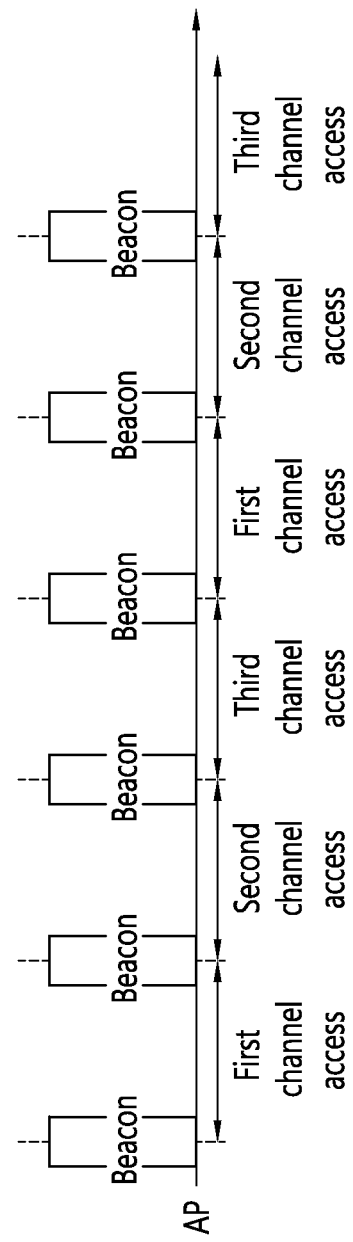
FIG. 12 is a diagram illustrating an example of an STA grouping-based channel access method according to an embodiment of the present invention.

FIG. 12 is a diagram illustrating an example of an STA grouping-based channel access method according to an embodiment of the present invention.

FIG. 12 illustrates an example of a channel access method of differently setting a channel access interval by STA groups.

Referring FIG. 12, when entire STAs are grouped as three STA groups, a channel access mechanism according to a beacon interval is shown.

A first beacon interval is a first channel access period for an STA group 1 according to a group ID 1. Accordingly, a beacon frame of the first beacon period may include a channel access information element indicating that STAs included in an STA group indicated by a group ID 1 may approach a channel. The STAs may determine whether the STAs may access a channel during a corresponding period through the channel access information element. Further, a beacon frame may include a TIM element for STAs included in a corresponding STA group. The TIM element may include bitmap information implemented to indicate whether there is a frame buffered through AIDs associated with a corresponding STA group. Accordingly, STAs included in an STA group 1 may access a channel to transceive data with the AP during a first channel access period.

A second beacon period is a second channel access period for an STA group 2 according to a group ID 2. Accordingly, a beacon frame of the second beacon period may include a channel access information element indicating that STAs included in an STA group indicated by a group ID 2 may approach the channel. The STAs may determine whether the STAs may access a channel during a corresponding period through the channel access information element. Further, a beacon frame may include a TIM element for STAs included in a corresponding STA group. The TIM element may include bitmap information implemented to indicate whether there is a frame buffered through AIDs associated with a corresponding STA group. Accordingly, STAs included in an STA group 2 may access a channel to transceive the data with the AP during a second channel access period.

A third beacon period is a third channel access period for an STA group 3 according to a group ID 3. Operation of STAs in a corresponding period may be performed as described above.

A fourth beacon interval is a second channel access period for an STA group 1 according to a group ID 1. A fifth beacon interval is a second channel access period for an STA group 2 according to a group ID 2. A sixth beacon interval is a third channel access period for an STA group 3 according to a group ID 2. That is, when entire STAs are grouped as three STA groups, channel access periods for three STA groups may be periodically repeated and formed.

In the channel access method as illustrated in FIG. 12, STAs of a different STA group may approach the channel every channel access period. Accordingly, the AP may generate bitmap information capable of indicating whether there is a buffered frame with respect to an STA group capable of accessing at a corresponding channel access period in order to generate a TIM element. Referring to FIGS. 9 to 11, since a specific STA group is a set of STAs to which an AID in a specific AID range is assigned, the size of bitmap information is reduced together with offset information and the bit information may configure efficient information capable of indicating presence of a buffered frame. That is, in the STA grouping-based channel access method, when the number of STAs are very large so that the number of assigned AIDs is more than that of existing AIDs, since grouping of the STA may be performed based on the AID, an efficient TIM element may be generated. Accordingly, data may be efficiently transceived based on a TIM protocol.

Meanwhile, although STA group of one step is performed in such a way that one STA group accesses during each beacon interval in an example of a channel access method shown in FIG. 12, the present invention suggest various channel access schemes. A channel access scheme according to the embodiment of the present invention may further assign a channel access period for a STA subgroup according to a grouping step of an STA. Each channel access period may be assigned to at least one STA group and/or at least one STA subgroup during one beacon interval. The channel access method according to the present will be described in detail later.

The AP may indicate an AID of an STA through AID fields of an association response frame and/or a reassociation response frame in order to assign an AID of the STA. Meanwhile, if the STA is grouped based on the AID, the AP may assign the AID to the STA and provide grouping related information. When the STA is grouped through one step, the AP may report the AID and a group ID to the STA. When the STA is grouped through at least two steps, the AP may provide detailed grouping related ID information as well as an AID, a group ID, and a subgroup index. In order to report grouping related information to the STA, a group assignment information element may be defined, and the group assignment information element may be included in an association response frame and/or a reassociation response frame to be transmitted.

Figure 13:
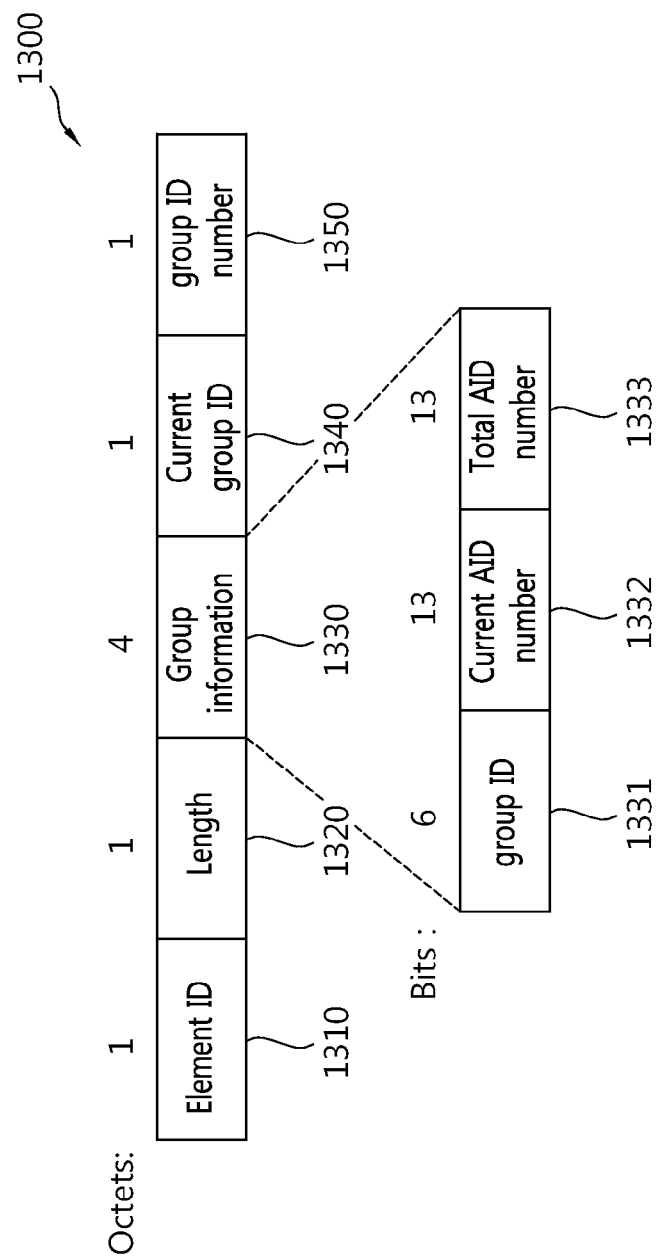
FIG. 13 is a block diagram illustrating an example of a group assignment information element format according to an embodiment of the present invention.

FIG. 13 is a block diagram illustrating an example of a group assignment information element format according to an embodiment of the present invention.

Referring to FIG. 13, the group assignment information element 1300 includes an element ID field 1310, a length field 1320, a group information field 1330, a Current Group ID field 1340, and a Number of Group ID field 1350.

The element ID field 1310 may set to indicate that a corresponding information element is a group assignment information element 1200.

The length field 1320 may be set to indicate a total length of a bit sequence configuring other fields included in the group assignment information element 1300 after the length field 1320.

The group information field 1330 includes grouping information for an STA for receiving the group assignment information element. The group information field 1330 may include a group ID sub-field 1331, a Current Number of AID sub-field 1332, and a Total Number of AID sub-field 1333.

The group ID sub-field 1331 may be set to indicate a group ID to identify an STA group including an STA.

The Current Number of AID sub-field 1332 may indicate the number of AIDs included in an STA group according to the group ID indicated by the group ID sub-field 1331, and may indicate the number of STAs included in an STA group according to the group ID.

The Total Number of AID sub-field 1333 may indicate the Total number of AIDs which may be included in an STA group according to the group ID indicated by the group ID sub-field 1331. The Total Number of AID sub-field 1333 may indicate the total number of STAs which may be included in an STA group according to a group ID.

The Current Group ID field 1340 may indicate a group ID of an STA group in which a channel access is allowed when corresponding information is transferred to the STA.

The Number of Group ID field 1350 may indicate the total number of STA groups.

In a channel access method of assigning a channel access period for an STA group according to a specific group ID by beacon intervals, the STA may determine a channel access period for an STA group to which the STA belongs through the Current Group ID field 1340 and the Number of Group ID field 1350. Accordingly, the STA may receive a beacon frame according to a corresponding channel access period to receive a buffered frame from an AP when there is a frame buffered through a TIM element, and may transceive the data with the AP during a corresponding channel access period.

Meanwhile, the AID may be assigned to the STA according to a device type of the STA. One AID in a specific AID range may be assigned to the STA of a specific device type. When STA group is performed based on the AID, the STA grouping may be performed according to a device type.

For example, two STA groups are set and accordingly AIDs may be divided into two groups. An AID belonging to a first STA group may be assigned to an STA to be used for over load. An AID belonging to a second STA group may be assigned to an STA to be used for sensor/meter.

Meanwhile, required device characteristics may be changed according to a device type. As one example of the characteristics, so as to reduce power consumption according to a device type, a maximum transmission power limit value may be differently set. Accordingly, a group of the STA is assigned, information to indicate a maximum transmission power value may be provided. This may be performed by FIG. 4 and providing a group assignment information element.

Figure 14:
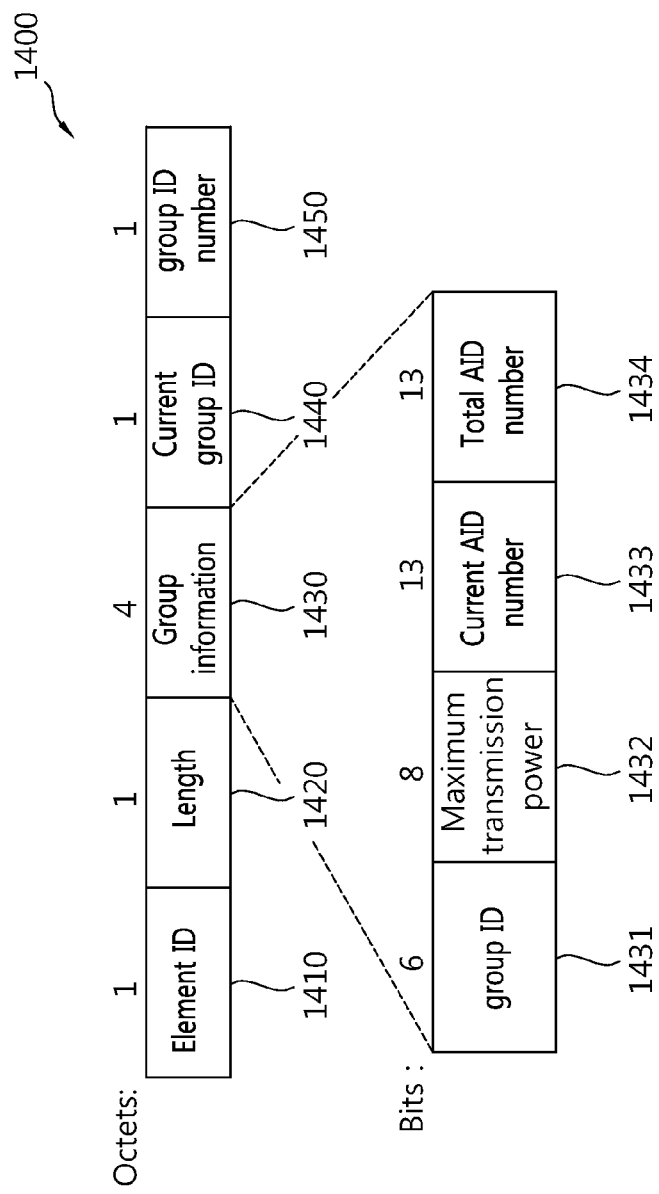
FIG. 14 is a block diagram illustrating another example of a group assignment information element format according to an embodiment of the present invention.

FIG. 14 is a block diagram illustrating another example of a group assignment information element format according to an embodiment of the present invention.

Referring to FIG. 14, the group assignment information element 1400 includes an element ID field 1410, a length field 1420, a group information field 1430, a current group ID field 1440, and a number of group ID field 1450. However, the element ID field 1410, since the length field 1420, the group information field 1430, the current group ID field 1440, and the number of group ID field 1450 of the group assignment information element 1400 are the same as the element ID field 1310, the length field 1320, the group information field 1330, the current group ID field 1340, and the number of group ID field 1350 of the group assignment information element 1330 of FIG. 13, respectively, a detailed description thereof is omitted.

The group information field 1430 of the group assignment information element 1400 includes a group ID sub-field 1431, a maximum transmission power sub-field 1432, a current number of AID sub-field 1433, and a total number of AID sub-field 1434. Since the group ID sub-field 1431, the Current Number of AID sub-field 1433, and the Total Number of AID sub-field 1434 are the same as the group ID sub-field 1331, the Current Number of AID sub-field 1332, and the Total Number of AID sub-field 1333 shown in FIG. 13, respectively, a detailed description thereof is omitted.

The maximum transmission power sub-field 1432 may indicate a limitation value of maximum transmission power which an STA group according to a group ID indicated by a group ID sub-field 1431 can use. A specific AID included in a specific AID range may be assigned to an STA of a specific device type and may be included in an STA group with limited maximum transmission power. Further, data transception with the AP may be performed during a channel access period using transmission power within a limitation value indicated by the maximum transmission power sub-field 1432.

Although the channel access method is described with reference to FIG. 12, various channel access method based on STA grouping will be now described.

Figure 15:
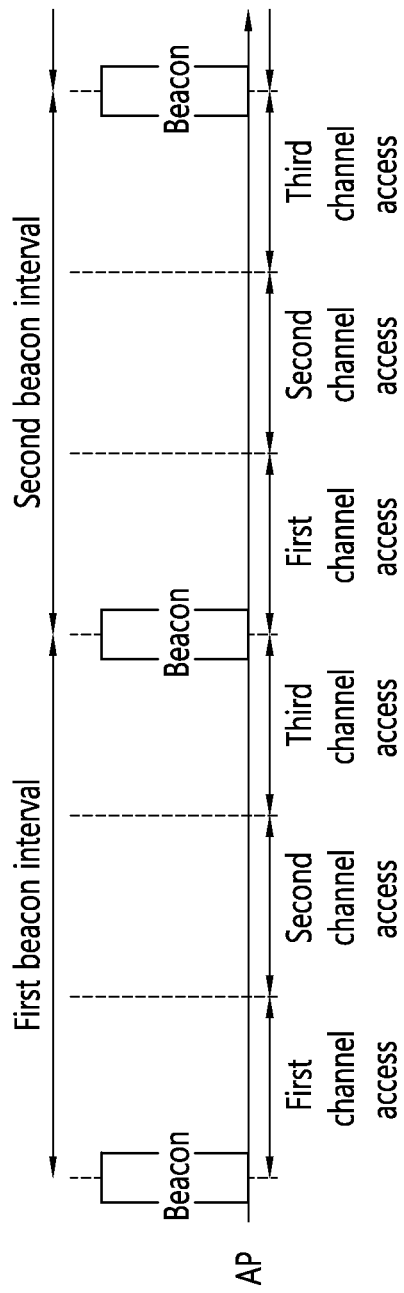
FIG. 15 is a diagram illustrating an example of a channel access method according to an embodiment of the present invention.

FIG. 15 is a diagram illustrating an example of a channel access method according to an embodiment of the present invention.

Referring to FIG. 15, one beacon interval may include three channel access periods.

Each channel access period may be set for each STA. According to the embodiment, STAs belonging to an STA group 1 during a first beacon interval access a channel during a first channel access period to transceive the data with the AP. Next, STAs belonging to an STA group 2 access a channel during a second channel access period to transceive the data with the AP, and STAs belonging to an STA group 3 access a channel during a third channel access period to transceive data with the AP. During a second beacon interval, a channel access period according to the first beacon interval may be repeated and formed.

In FIG. 15, channel access periods in one beacon interval are equally assigned by the total number of STA groups, and the channel access periods are sequentially assigned in the order of the STA groups. Accordingly, although special information is not included in a beacon frame, an STA knowing the total number of STA groups and an STA group to which the STA belongs may recognize when starts and terminates a channel access period.

Meanwhile, unlike FIG. 15, a channel access period is not equally assigned to each STA group in one beacon interval, and an assignment order of the channel access period may be assigned regardless of the order of the STA groups. The channel access method may be performed with reference to FIG. 16.

Figure 16:
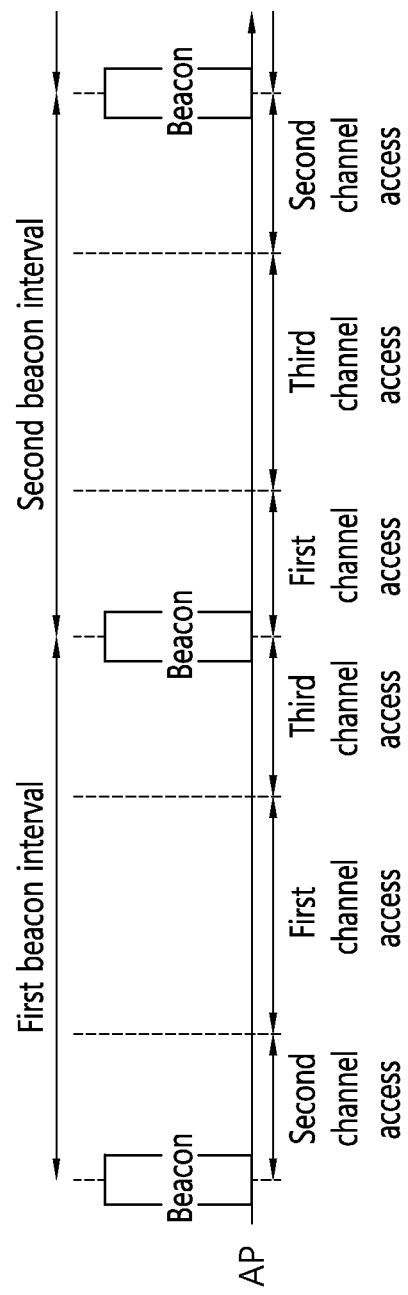
FIG. 16 is a diagram illustrating another example of a channel access method according to an embodiment of the present invention.

FIG. 16 is a diagram illustrating another example of a channel access method according to an embodiment of the present invention.

Referring to FIG. 16, it may be understood that a plurality of channel access periods are assigned in one beacon interval, and lengths of respective access periods are set differently from each other. In this case, an STA additionally needs information on a corresponding channel access period to access a channel according to a channel access period for an STA group to which the STA belongs. To this end, the beacon frame may include a channel access information element.

Figure 17:
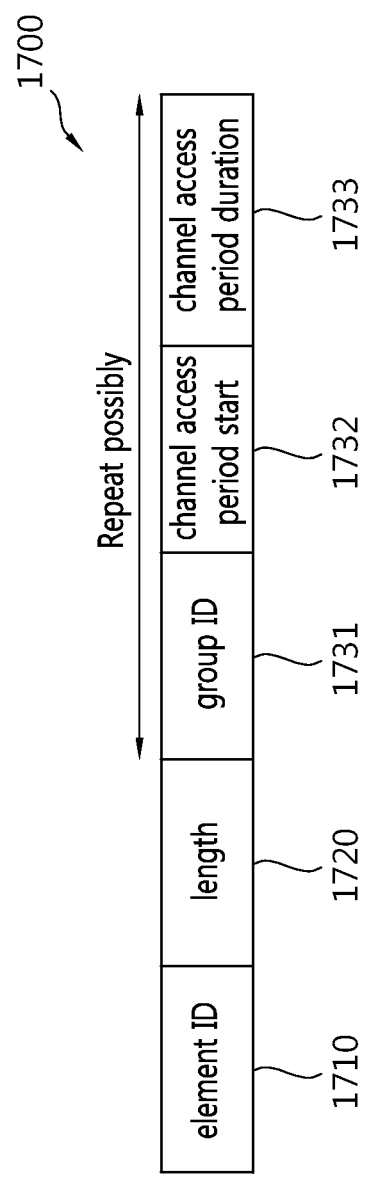
FIG. 17 is a block diagram illustrating an example of a channel access information element format.

FIG. 17 is a block diagram illustrating an example of a channel access information element format.

Referring to FIG. 17, the channel access information element 1700 includes an element ID field 1710, a length field 1720, a group ID field 1731, a channel access period start field 1732, and a channel access period duration field 1733.

The element ID field 1710 may be set to indicate that a corresponding information element is a channel access information element 1700.

The length field 1720 may be set to indicate a total length of a bit sequence configuring fields included after the length field 1720 in the channel access information element 1700.

The group ID field 1731, the channel access period start field 1732, and the channel access period duration field 1733 implement information on a channel access period with respect to a specific STA group.

The group ID field 1731 may include a group ID associated with an STA group capable of accessing a channel during a channel access period specified by the channel access period start field 1732 and the channel access period duration field 1733.

The channel access period start field 1732 indicates a time point when a channel access period for an STA group indicated by the group ID field 1731 starts. A value indicated by the channel access period start field 1732 may indicate a time interval to a start time point based on a beacon frame transmission time point when the channel access information element 1700 is included and transmitted.

The channel access period duration field 1733 may be set to indicate a duration time of a channel access period for an STA group indicted by the group ID field 1731.

Meanwhile, The group ID field 1731, the channel access period start field 1732, and the channel access period duration field 1733 may be repeatedly included by the number of channel access periods assigned in a beacon interval associated with a beacon frame to which the channel access information element 1700 is included and transmitted. Accordingly, when the STA interprets the channel access information element 1700 of the beacon frame, the STA may know how many fields of a channel access period are repeated in a corresponding information element through a value of the length field 1720.

Referring back to FIG. 16, a first beacon interval and a second beacon interval include three channel access periods, respectively. Accordingly, a channel access period information element with information on a channel access period in the first beacon interval and a channel access period information element with information on a channel access period in the second beacon interval may include fields for a first channel access period, fields for a second channel access period, and fields for a third channel access period.

STAs may determine a period when the STAs may approach a channel based on a channel access period information element of a beacon frame. Each STA may access the channel at a channel access period for each STA to exchange data with the AP. When a current period is a channel access period for an STA operating in a power save mode, the STA operates in a sleep state. If the channel access period for the STA starts, the STA may enter an awake state to operate.

Meanwhile, in the STA grouping-based channel access method, all STAs may access a channel during a corresponding period by setting a specific period being all channel access period and may be set to exchange data with the AP.

Only specific STAs which are not associated with the AP during the specific period being all channel access period may be implemented to transmit a frame to the AP through a channel access.

Figure 18:
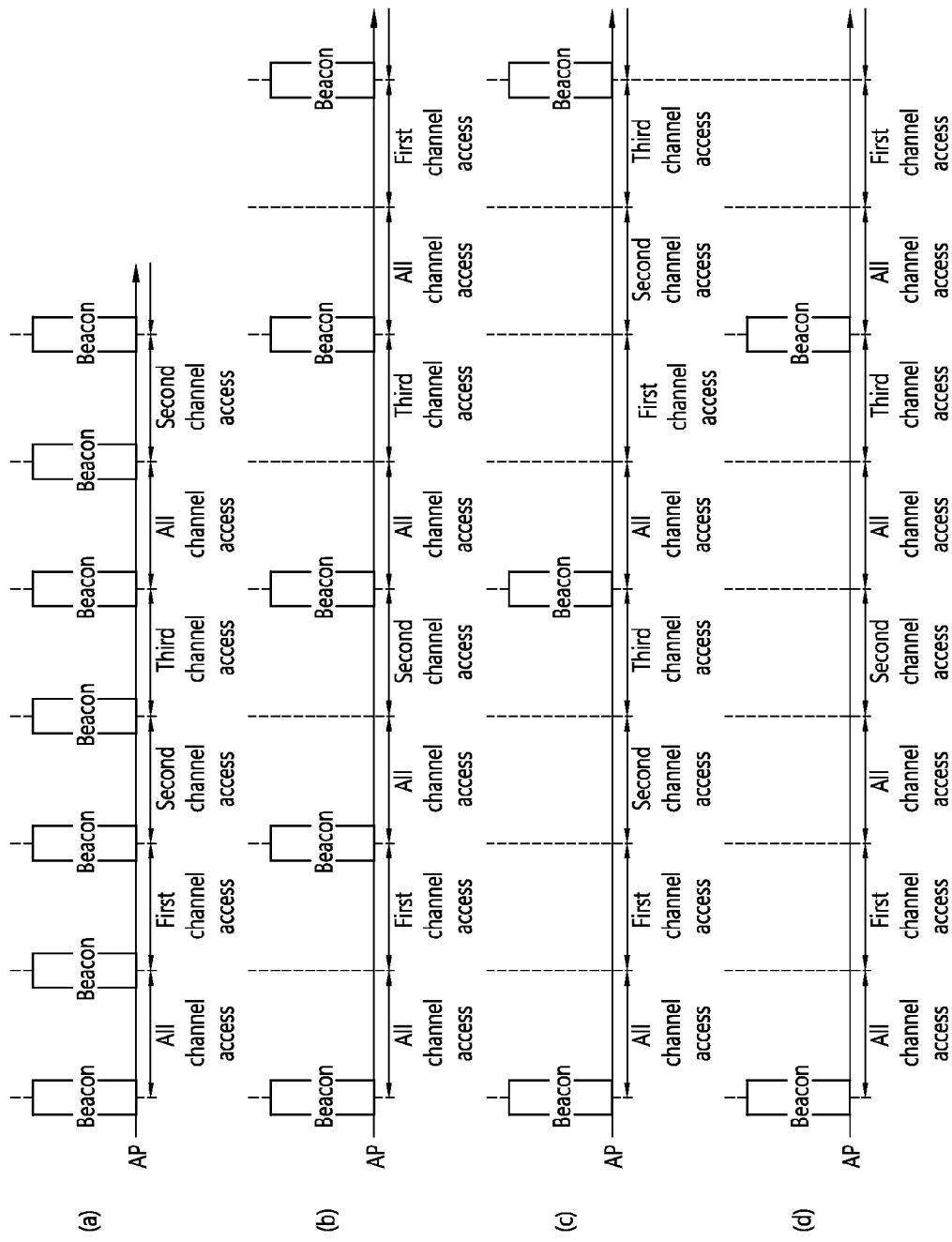
FIG. 18 is a diagram illustrating an example of a channel access method according to an embodiment of the present invention.

When all channel access period is set, the channel access method may be performed as illustrated in FIG. 18.

FIG. 18 is a diagram illustrating an example of a channel access method according to an embodiment of the present invention.

Referring to subfigure (a) of FIG. 18, a specific beacon interval may be set as all channel access period. The subfigure (a) may illustrate an example when all channel access period are added in a channel access method as illustrated in FIG. 12.

In a case of the subfigure (a), since a channel access period with respect to one STA group is set in a beacon interval, the beacon frame may be transmitted to include a TIM for a corresponding STA group. In this case, an operation of receiving a buffered frame based on the TIM may be performed during a channel access period for the STA group.

Referring to subfigure (b) of FIG. 18, all channel access period and a channel access period for a specific STA group may be assigned in the beacon interval. According to an example shown in the subfigure (b), it may be understood that duration times of all channel access period and a channel access period for a specific STA group are the same as each other, and all channel access period are set after transmission of the beacon frame. In this case, the STA may not clearly receive information on a channel access period set in a corresponding beacon interval but may distinguish the all channel access period from the channel access period for the specific STA group. This is because the STA know that channel access periods are sequentially set by STA groups and a channel access period for a specific STA group starts after half of the beacon interval. Accordingly, the STA may determine whether the STA has a channel access authority during a channel access period for a specific STA group to operate.

In a case of the subfigure (b), the all channel access period is disclosed before the channel access period for the specific STA group, which is illustrative purpose only. That is, a method where the all channel access period is disclosed after the channel access period for the specific STA group may be considered.

Referring to subfigure (c) of FIG. 18, the all channel access period and channel access periods for respective STA groups may be set in the beacon interval to have an equal duration time. Since the STA may know that the all channel access period and channel access periods for respective STA groups are sequentially set in the beacon interval, the STA may access the channel during a channel access period for an STA group to which the STA belongs to exchange data with the AP. Meanwhile, the all channel access period may be implemented according to setting so that all STAs may access the channel or an STA which is not associated with the AP may access the channel.

As shown, the all channel period is disclosed before channel access periods for respective STA groups, which is illustrative purpose only. That is, a method may be considered where the all channel period is disclosed after channel access periods for STA groups.

Referring to subfigure (d) of FIG. 18, the all channel access period of an STA group may be set in a beacon interval before channel access periods for respective STA groups.

In scheduling of various channel access periods shown in FIG. 18, since information on at least one channel access period assigned in a corresponding beacon interval is included in a transmission beacon frame to be transmitted from the AP, the information is transferred to the STA so that information on the channel access period may be shared between the AP and the STA. In this case, the information on the channel access period may be the above channel access information element. Signaling with respect to scheduling of a channel access period is previously achieved between the STA and the AP so that information on the channel access period may be shared.

According to the channel access method described with reference to the drawings, there has been suggested a method where channel access periods are set by STA groups and each STA accesses a channel according to a channel access period to exchange data with the AP. Meanwhile, as shown in FIG. 11, STAs may be grouped as STA subgroups. In this case, the channel access period is set with respect to an STA group and/or an STA subgroup, and each STA accesses a channel according to a preset channel access period to exchange data with the AP.

Figure 19:
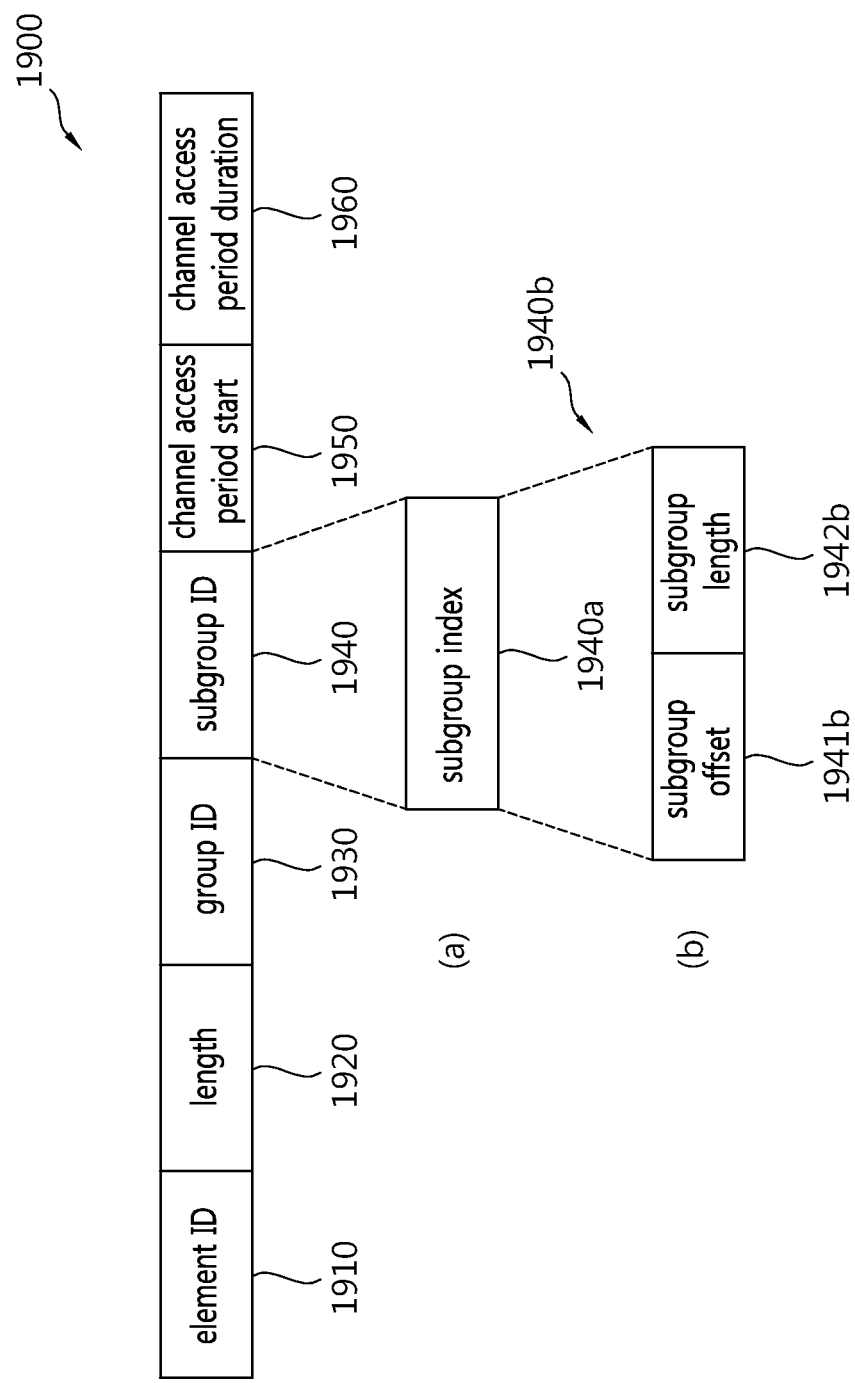
FIG. 19 is a block diagram illustrating another example of a channel access information element format according to an embodiment of the present invention.

FIG. 19 is a block diagram illustrating another example of a channel access information element format according to an embodiment of the present invention.

Referring to FIG. 19, the channel access period information element 1900 includes an element ID field 1910, a length field 1920, a group ID field 1930, a subgroup ID field 1940, a channel access period start field 1950, and a channel access period duration field 1960.

The element ID field 1910 may be set to indicate that a corresponding information element is a channel access information element 1900.

The length field 1920 may be set to indicate a total length of a bit sequence configuring fields included after the length field 1920 in the channel access information element 1900.

The group ID field 1930 and the subgroup ID field 1940 implement an STA group and/or at least one STA subgroup capable of accessing a channel during a channel access period specified by the channel access period start field 1950 and the channel access period duration field 1960.

When the channel access period is a channel access period for a specific STA group, the group ID field 1930 includes a group ID associated with a corresponding STA group, and the subgroup ID field 1940 may be set to indicate a value (e.g. Null value) which is not specified. In this case, the channel access period start field 1950 and the channel access period duration field 1960 specify a channel access period for a corresponding STA group.

When the channel access period is a channel access period for at least one STA subgroup, the group ID field 1930 may be set to include a group ID associated with an STA group with at least one STA subgroup. Meanwhile, the subgroup ID field 1940 may be implemented in two schemes.

Referring to subfigure (a) of FIG. 19, a subgroup ID field includes a subgroup index sub-field 1940*a*. The subgroup index sub-field 1940*a* may indicate a subgroup index associated with an STA subgroup capable of accessing the channel during a channel access period specified by the channel access period start field 1950 and the channel access period duration field 1960.

Referring to subfigure (b) of FIG. 19, a subgroup ID field 1940*b* includes a group offset sub-field 1941*b* and a subgroup length field 1942*b*. The group offset sub-field 1941*b* indicates an STA subgroup having the smallest subgroup index in at least one STA subgroup among a plurality of STA subgroups of an STA group indicated by the group ID field

1930. The group offset sub-field 1942*b* indicates the number of STA subgroups of continuous indexes including an STA subgroup indicated by the group offset sub-field 1941*b*. Accordingly, at least one STA subgroup may be indicated by the group ID field 1930, the group offset sub-field 1941*b*, and a subgroup length field 1942*b*.

The channel access period start field 1950 indicates a time point when a channel access period for at least one STA subgroup indicated by the group ID 1930 and the subgroup ID field 1940 starts. The channel access period duration field 1960 may be set to indicate a duration time of a channel access period for at least one STA subgroup indicated by the group ID 1930 and the subgroup ID field 1940.

Figure 20:
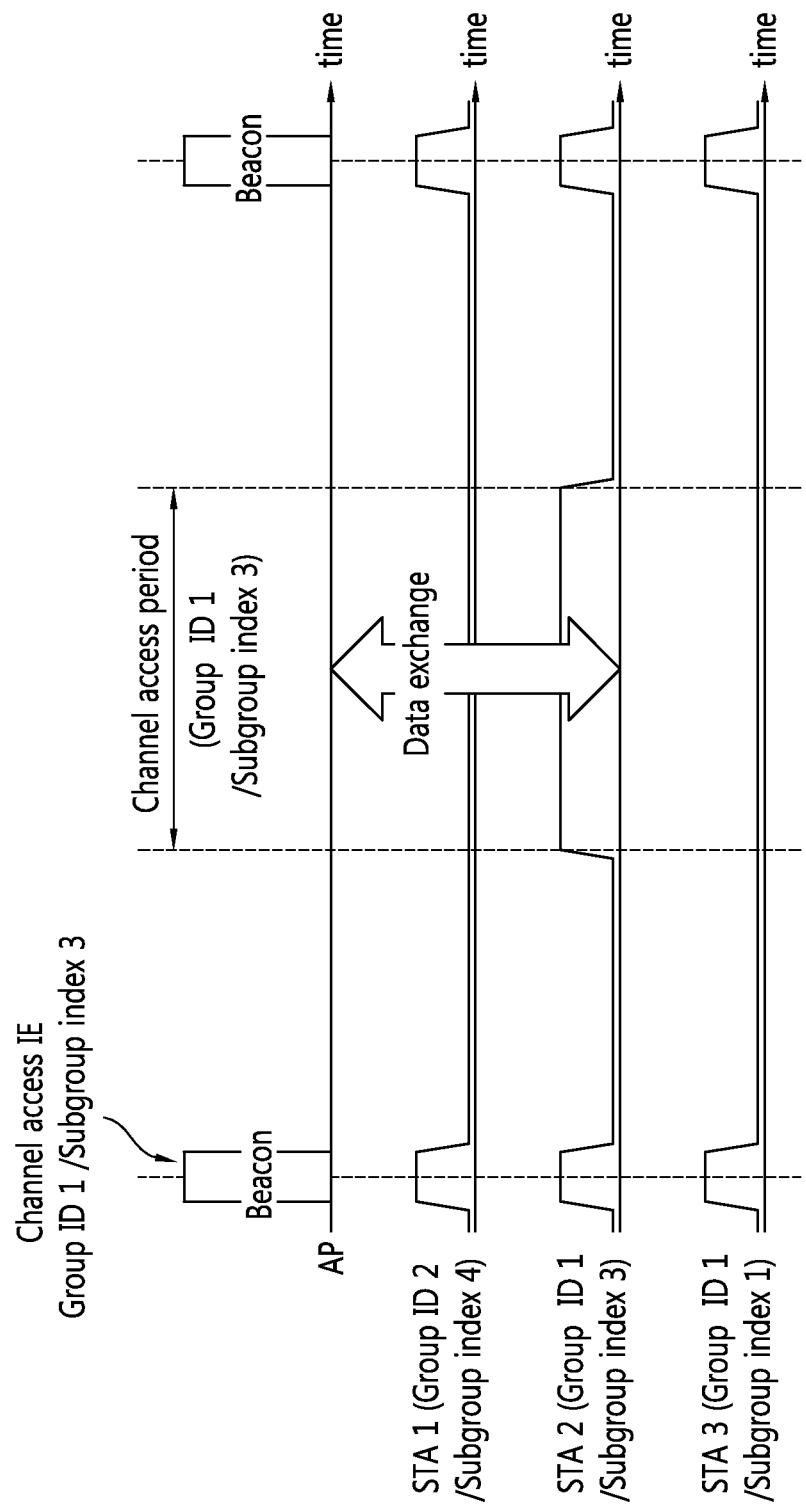
FIG. 20 is a diagram illustrating another example of a channel access method according to an embodiment of the present invention.

FIG. 20 is a diagram illustrating another example of a channel access method according to an embodiment of the present invention.

Referring to FIG. 20, an STA1 is included in an STA subgroup indicated by a group ID 2 and a subgroup index 4. An STA2 is included in an STA subgroup indicated by a group ID 1 and a subgroup index 3. An STA3 is included in an STA subgroup indicated by a group ID 1 and a subgroup index 1.

The STA1, the STA2, and the STA3 enters an awake state at a transmission time point of a beacon frame to receive the beacon frame and a channel access information element of a format as illustrated in FIG. 19 is included in the beacon frame so that the beacon frame is transmitted. The STA1 to STA3 acquire information on a channel access period through a channel access information element.

The STA1 to STA3 may determine whether a channel access period therefor starts through a group ID field and a subgroup ID field of the channel access information element.

Since the group ID field indicates a group ID 1, the STA 1 confirms that the information is not information on a channel access period for the STA1. Accordingly, the STA1 may maintain a sleep state to operate after reception of the beacon frame.

Since a group ID field indicates a group ID 1 and a subgroup ID field indicates a subgroup index 3, an STA2 may determine whether information on the channel access period is information for the STA2. Accordingly, the STA2 enters an awake state at a time point indicated by a channel access period start field to exchange data with the AP during a duration time indicated by the channel access period duration field. If the channel access period is terminated, the STA2 again enters a sleep state.

Since a group ID field indicates a group ID 1 but a subgroup ID field indicates a subgroup index 1, an STA3 confirms that the information is not information on a channel access period for the STA3. Accordingly, the STA3 may maintain a sleep state to operate after reception of the beacon frame.

Figure 21:
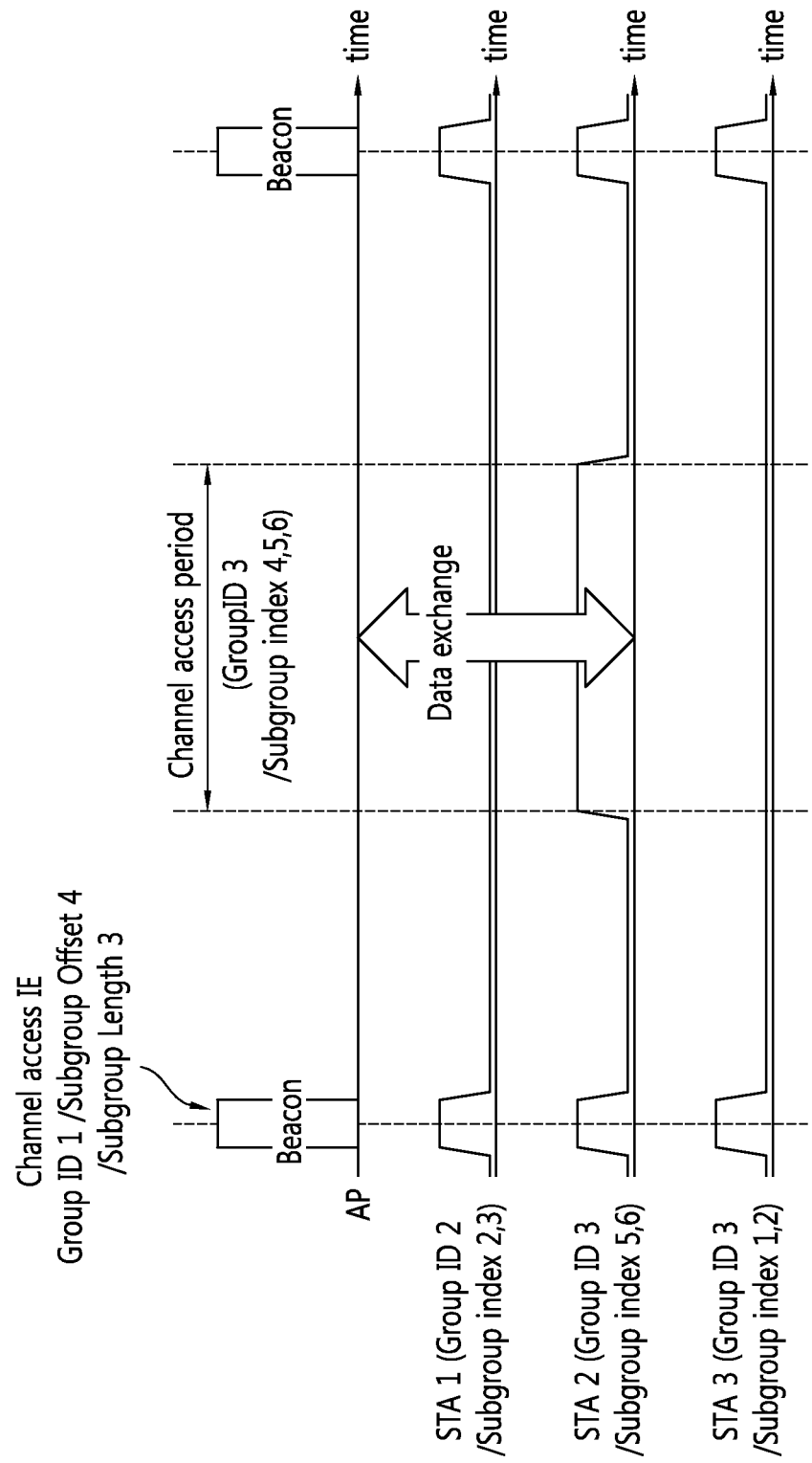
FIG. 21 is a diagram illustrating another example of a channel access method according to an embodiment of the present invention.

FIG. 21 is a diagram illustrating another example of a channel access method according to an embodiment of the present invention.

Referring to FIG. 21, STAs 1 include at least one STA included in STA subgroups indicated by a group ID 2, a subgroup index 2, and a subgroup index 3. STAs 2 includes at least one STA included in STA subgroups indicated by a subgroup index 5 and a subgroup index 6. STAs 3 includes at least one STA included in STA subgroups indicated by a group ID 3, a subgroup index 1, and a subgroup index 2.

The STAs 1, the STAs 2, and the STAs 3 enter an awake state at a transmission time point of a beacon frame to receive the beacon frame, and a channel access information element of a format as illustrated in FIG. 19 is included in the beacon frame so that the beacon frame is transmitted. The STAs 1 to STAs 3 acquire information on the channel access period through the channel access information element.

The STAs 1 to STAs 3 may determine whether the channel access period therefor starts through a group ID field and a subgroup ID field of the channel access information element. The group ID field of the channel access information element indicates the group ID 3, and the subgroup offset sub-field indicates a subgroup index 4 and a subgroup length sub-field. Accordingly, it is understood that a corresponding channel access period is for STA subgroups indicated by subgroup indexes 4, 5, and 6 of an STA group indicated a group ID 3.

Since the group ID field indicates the group ID 3, the STAs 1 confirms that the information is information on a channel access period therefor. Accordingly, the STAs 1 may maintain a sleep state to operate after reception of the beacon frame.

Since the group ID field indicates a group ID 3, and a subgroup offset of the subgroup ID field and a subgroup length sub-field indicates STA subgroups according to subgroup indexes 4, 5, and 6, the STAs 2 may determine that information on the channel access period is information therefor. Accordingly, the STAs 2 enter an awake state at a time point indicated by a channel access period start field to exchange data with the AP during a duration time indicated by a channel access period duration field. If the channel access period is terminated, the STAs 2 again enter a sleep state.

Since the group ID field indicates the group ID 3 but subgroup offset of the subgroup ID field and the subgroup length sub-field indicate STA subgroups according to subgroup indexes 4, 5, and 6, STAs 3 confirm that the formation is information on the channel access period therefor. Accordingly, the STAs 3 may maintain a sleep state to operate after reception of the beacon frame.

The above channel access method based on STA grouping may perform STA grouping based an AID of an STA to divide and assign channel access periods by STA groups. Each STA group or each STA subgroup may exchange data with the AP during a channel access period assigned thereto. Accordingly, a wireless LAN system with very many STAs may efficiently exchange the data by STA groups.

Meanwhile, an AP may dynamically correct the number of STA groups and the number of terminals belonging to each STA group. In this manner, a TIM protocol may be more efficiently operated by dynamically adjusting the number of STA groups and the number of STAs included in each STA group. To this end, there is a need to efficiently update a grouping parameter to change STAs. To this end, the AP transfers grouping parameter information to the STAs at a predetermined time interval, and the STAs hears a corresponding grouping parameter to synchronize the grouping parameter information with the AP.

When STAs are grouped as STA groups 1, 2, and 3, the STAs receive a first beacon frame starting grouping in order to hear grouping parameter from the AP. In general, since all STAs receive a beacon frame at a DTIM interval, a first beacon frame starting the grouping, that is, a beacon frame including a grouping parameter may be a beacon frame with a DTIM. The DTIM Beacon frame includes the grouping parameters illustrated in FIG. 13 and FIG. 14. Further, the STAs may indicate whether there is a buffered traffic with respect to terminals belonging to each STA group to the STAs in the form of a bitmap by group IDs.

FIG. 22 is a block diagram illustrating an example of a grouping parameter information element format according to an embodiment of the present invention.

Referring to FIG. 22, a grouping parameter information element 2200 includes an element ID field 2210, a length field 2220, a current group ID field 2230, a number of group ID field 2240, a total number of AID field per STA group 2250, and a group ID bitmap field 2260.

The element ID field 2210 may be set to indicate that a corresponding information element is a grouping parameter information element 2200.

The length field 2220 may be set to indicate a length of the grouping parameter information element 2200 and/or a length of a bit sequence configuring fields included after the length field 2220 in the grouping parameter information element 2200. Meanwhile, the length field 2220 may be set to indicate a length of the group ID bitmap field 2260. The STA receiving the grouping parameter information element 2200 may calculate a variable length of the group ID bitmap field 2260 through information indicated by the length field 2220.

The current group ID field 2230 may indicate a group ID which the AP wants to update group ID related information through the grouping parameter information element 2200. When the AP updates a plurality of group IDs, it may be interpreted that a group ID indicated by the current group ID field 2230 indicates a first group ID among a plurality of updated group IDs. For example, when grouping parameters associated with group IDs 1, 2, and 3 are updated, the current group ID field 2230 may indicated the group ID 1. Meanwhile, a form expressing the group ID may refer to FIGS. 9 to 11.

The AP may dynamically correct the number of STA groups and the number of terminals belonging to each STA group. To this end, the AP may set and add the number of group ID field 2240 and the total number of AID field per STA group 2250 into the grouping parameter information element 2200 to transmit the grouping parameter information element 2200.

The number of group ID field 2240 may indicate the number of STA groups in which grouping information is updated through the grouping parameter information element 2200. The TIM element may be provided per STA group.

The total number of AID field per STA group 2250 may indicate the total number of AIDs belonging to an STA group, and may be interpreted to indicate the number of STAs belonging to each STA group. The total Number of AID per STA group 2250 may indicate an AID range covered with TIM elements of each STA group.

The group ID bitmap field 2260 indicates whether there is a buffered frame per STA group, and may be implemented as a bitmap sequence.

For example, when the current group ID field 2230 indicates a group ID 1 and the number of group ID field 2240 indicates a group ID 3, if the group ID bitmap field 2260 indicates 0, 0, 1, it means that there is no buffered frame with respect to STAs belonging to STA groups 1 and 2 according to the group ID 1 and the group ID 2. Meanwhile, it means that there is a buffered frame with respect to STAs belonging to the STA group 3 according to the group ID 3. Accordingly, the STAs belonging to the STA group 3 may enter an awake state during a channel access period for the STA group 3, and may receive a TIM element from the AP to confirm whether there is a frame buffered therein.

Bitmap information of the TIM element may be implemented to indicate whether there are buffered frames for STAs to which a specific STA group belongs. That is, although an existing TIM element includes bitmap type information to indicate whether there are buffered frames with respect to entire STAs, a TIM element transmitted during a channel access period for the specific STA group may include bitmap type information with respect to a corresponding STA group in a wireless LAN system to which the grouping parameter information element is applied. The TIM element may further include a group ID field in order to indicate an STA group to which the included bitmap type information is applied.

If the STA confirms that there is a buffered frame for an STA group to which the STA belongs, the STA may receive a TIM element during a channel access period for a corresponding STA group to confirm that a corresponding TIM element includes information for the corresponding STA group. When the STA confirms that the TIM element is information for the corresponding STA group, the STA may determine whether there is a buffered frame for the STA based on bitmap type information. When there is the buffered frame for the STA, the STA may request transmission of the buffered frame to the AP during a channel access period to acquire the buffered frame.

In this manner, when the TIM element is implemented, an overhead due to the bitmap type information included in the TIM element may be reduced as compared with that of the related art, and a TIM protocol based buffered traffic may be efficiently processed.

If the STA receives the grouping parameter information element 2200 through a beacon frame transferring a DTIM and/or a beacon frame transferring a TIM, the STA may be operated during a channel access period for the STA according to a newly grouped STA group. That is, the STA may enter an awake state during the channel access period to exchange data with the AP, and may enter a doze state to operate during remaining periods.

The grouping parameter information element associated with update of the above grouping parameter and an operation of the STA according to the grouping parameter information element are applicable associated with STA subgroups.

Figure 23:
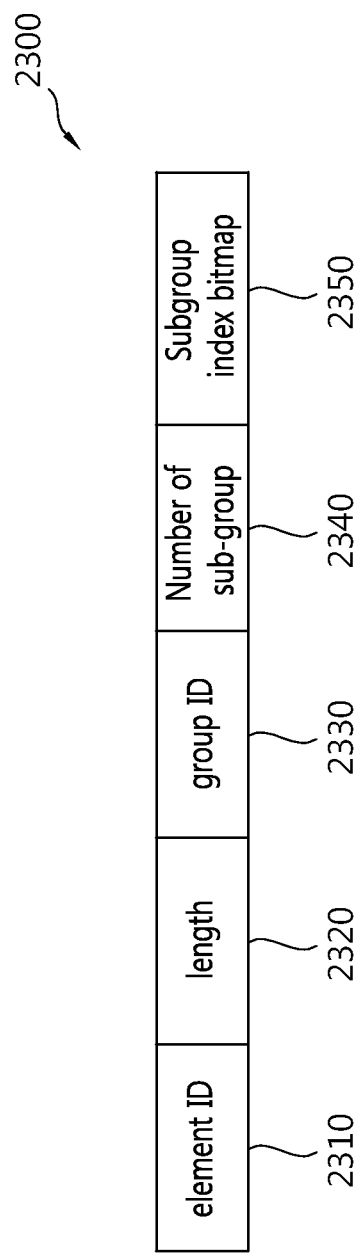
FIG. 23 is a block diagram illustrating an example of a subgrouping parameter information element format according to an embodiment of the present invention.

FIG. 23 is a block diagram illustrating an example of a subgrouping parameter information element format according to an embodiment of the present invention.

Referring to FIG. 23, a subgrouping parameter information element 2300 may include an element ID field 2310, a length field 2320, a group ID field 2330, a number of subgroup field 2340, and a subgroup index bitmap field 2350.

The element ID field 2310 may be set to indicate that a corresponding information element is the subgrouping parameter information element 2300.

The length field 2320 may be set to indicate a length of the subgrouping parameter information element 2300 and/or a length of a bit sequence configuring fields included after the length field 2320 in the subgrouping parameter information element 2300. Meanwhile, the length field 2320 may be set to indicate a length of the subgroup index bitmap field 2350. The STA receiving the grouping parameter information element 2300 may calculate a variable length of the subgroup index bitmap field 2350 through information indicated by the length field 2320.

The group ID field 2330 may include a group ID to identify a group STA associated with the grouping parameter information element 2300. That is, the AP may indicate a group ID to identify an STA group in order to subgroup related information through the grouping parameter information element 2300.

The number of subgroup field 2340 may indicate the number of STA subgroups divided from a STA group indicated by the group ID field 2330.

The subgroup index bitmap field 2350 indicates whether there is a buffered frame per the STA subgroup. When the number of subgroup field 2340 indicates 4, the subgroup index bitmap field 2350 may indicate whether there is a buffered frame with 4 STA subgroups as a bitmap type. If the subgroup index bitmap field 2350 indicates 0, 0, 0, 1, it means that there is no buffered frame with respect to STAs belonging to STA subgroups 1 to 3 according to subgroup indexes 1 to 3. Accordingly, since STAs belonging to STA subgroups 1 to 3 of a corresponding STA group know that there is no buffered frame therefor although the STAs receive a TIM element in a channel access period for a corresponding STA subgroup afterwards, the STAs may not request transmission of the buffered frame.

In contrast, it means that there is a buffered frame with respect to STAs belonging to an STA subgroup 4 according to a subgroup index 4. Accordingly, STAs included in the STA subgroup 4 may enter an awake state during a channel access period for an STA subgroup 4 of a corresponding STA group and may receive a TIM element from the AP to confirm whether there is a frame buffered therein.

The TIM element includes bitmap type information to identify whether there is a buffered frame with respect to STAs included in a specific STA subgroup of a specific STA group. Accordingly, the TIM element may include information to indicate an STA group and an STA subgroup corresponding to the included bitmap type information. To this end, the TIM element may further include a group ID field and a subgroup index ID field. An STA receiving the TIM element may determine whether a corresponding TIM element includes bitmap type information to indicate presence of a buffered frame for the STA based on a group ID field and a subgroup index field. Further, the bitmap type information may be implemented by a bitmap sequence mapped to STAs included in at least one STA subgroup indicated by the group ID field and the subgroup index field. Accordingly, the STA may receive the bitmap type information to confirm whether there is a buffered frame for the STA. When there is the buffered frame for the STA, the STA may request transmission of the buffered frame to the AP.

When STAs receiving the subgrouping parameter information element 2300 operate in a power save mode, the STAs may enter an awake state to exchange data with the AP during a channel access period with respect to an STA subgroup to which the STAs belong, and may enter a sleep state to operate during remaining periods.

The above subgrouping parameter information element may be added to a first beacon frame to which a DTIM is transmitted and/or a second beacon frame to which a TIM is transmitted so that the first beacon frame and/or the second beacon frame may be transmitted.

The data can be transceived based on the TIM element with compressed bitmap type information through the grouping parameter information element and the subgrouping parameter information element. This may significantly reduce the overhead according to an existing TIM element to provide efficient TIM element based data transception. Further, STAs corresponding to a channel access period request transmission of a buffered frame to the AP so that a throughput rate of data can be improved and remaining STAs operates in a sleep state to increase power save efficiency.

Figure 24:
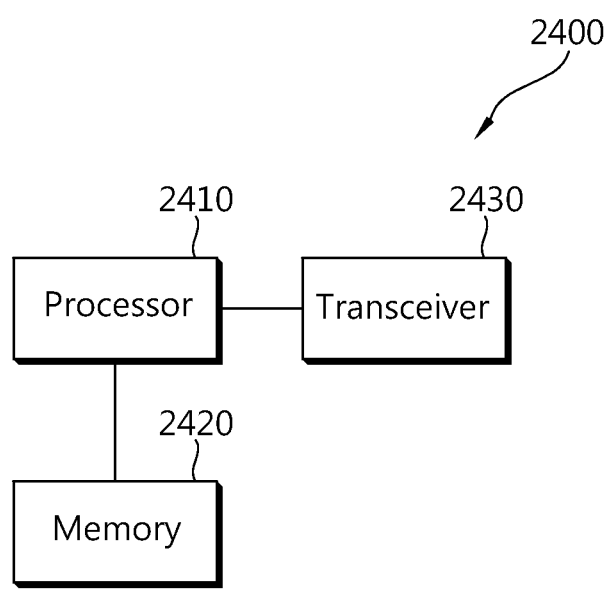
FIG. 24 is a block diagram illustrating a wireless apparatus to implement the embodiments of the present invention.

FIG. 24 is a block diagram illustrating a wireless apparatus to implement the embodiments of the present invention.

Referring to FIG. 24, a wireless apparatus 2400 include a processor 2410, a memory 2420, and a transceiver 2430. The transceiver 2430 transmits and/or receives a wireless signal, and implements a physical layer of IEEE 802.11. The processor 2410 may be functionally connected to the transceiver 2430 to be operated. The processor 2410 may be set to implement an STA grouping-based data transceiving method shown in FIGS. 9 to 23.

The processor 2410 and/or the transceiver 2430 may include an Application-Specific Integrated Circuit (ASIC), another chipset, a logic circuit and/or a data processor. When an embodiment is implemented by software, the above scheme may be implemented by a module (procedure, function and the like) to perform the above function. The module is stored in the memory 2420 and may be executed by the processor 2410. The memory 2420 may be included inside the processor 2410. The memory 2420 is separately located outside the processor 2410 and may be functionally connected to the processor 2410 by various means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving data in a wireless local area network system, the method performed by a station (STA) operating in a power save mode comprising:

receiving, from an access point (AP), a beacon frame including a Traffic Indication Map (TIM) element, a group ID field, a transmit power field, and a channel access information field, wherein the group ID field indicates a STA group including a plurality of STAs, wherein the TIM element includes a TIM bitmap field indicating whether there is a buffered frame for at least one STA belonging to the STA group, wherein the transmit power field indicates a maximum transmit power assigned for the STA group, wherein the channel access information field indicates an access duration for the STA group;

determining whether there is a buffered frame for the STA based on the TIM element and the group ID field; and transmitting a power save poll (PS-poll) frame to the AP during the access duration when there is a buffered frame for the STA according to the maximum transmit power.

2. The method of claim 1, wherein the beacon further includes an association identifier (AID) field indicating a range of AIDs for the STA group.

3. The method of claim 1, further comprising:

entering into a doze state when there is no buffered frame for the STA.

4. A station (STA) for receiving data in a wireless local area network system, the station comprising:

a transceiver that transmits and receives radio signals; and a processor, operatively coupled with the transceiver, that:
instructs the transceiver to receive, from an access point (AP), a beacon frame including a Traffic Indication Map (TIM) element, a group ID field, a transmit power field, and a channel access information field, wherein the group ID field indicating a STA group including a plurality of STAs, wherein the TIM element includes a TIM bitmap field indicating whether there is a buffered frame for at least one STA belonging to the STA group, wherein the transmit power field indicates a maximum transmit power assigned for the STA group, wherein the channel access information field indicates an access duration for the STA group;
determines whether there is a buffered frame for the STA based on the TIM element and the grouping ID field; and
instructs the transceiver to transmit a power save poll (PS-poll) frame to the AP during the access duration when there is a buffered frame for the STA according to the maximum transmit power.

5. The STA of claim 4, wherein the beacon further includes an association identifier (AID) field indicating a range of AIDs for the STA group.

* * * * *